United States Patent
Semenov et al.

(10) Patent No.: US 12,147,585 B2
(45) Date of Patent: *Nov. 19, 2024

(54) DISTRIBUTED APPLICATION ARCHITECTURES USING BLOCKCHAIN AND DISTRIBUTED FILE SYSTEMS

(71) Applicant: eBay Inc., San Jose, CA (US)

(72) Inventors: Dmytro Semenov, San Jose, CA (US); Mahesh Kumar Dathrika, Santa Clara, CA (US); Michael Rawlings, San Jose, CA (US); Dylan Nelson Jamie Piercey, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/227,019

(22) Filed: Jul. 27, 2023

(65) Prior Publication Data

US 2024/0020421 A1 Jan. 18, 2024

Related U.S. Application Data

(63) Continuation of application No. 16/396,559, filed on Apr. 26, 2019, now Pat. No. 11,803,664.

(Continued)

(51) Int. Cl.
*G06F 16/182* (2019.01)
*G06F 16/23* (2019.01)
(Continued)

(52) U.S. Cl.
CPC ............ *G06F 21/64* (2013.01); *G06F 16/183* (2019.01); *G06F 16/1834* (2019.01);
(Continued)

(58) Field of Classification Search
CPC .................................................. G06F 16/1834
See application file for complete search history.

(56) References Cited

U.S. PATENT DOCUMENTS 10,095,888 B1 10/2018 Lee et al.
2005/0289131 A1* 12/2005 Aenlle ................ G06Q 30/02
(Continued)

FOREIGN PATENT DOCUMENTS

CN 107249046 A 10/2017
CN 107615730 A 1/2018
(Continued)

OTHER PUBLICATIONS

Nizamuddin et al., "IPFS—Blockchain-based Authenticity of Online Publications", Department of Electrical and Computer Engineering Khalifa University of Science, Technology and Research, Jun. 2018, pp. 1-6.

(Continued)

*Primary Examiner* — Grace Park
(74) *Attorney, Agent, or Firm* — Shook, Hardy & Bacon L.L.P.

(57) ABSTRACT

Technologies are shown for storing data from a data object in a distributed application architecture and reassembling the data object from the stored data. A first set of data from the data object is stored on a distributed file system, and a second set of data from the data object is stored on a blockchain. In response to a request for the data object, a script from the blockchain is executed to generate a reassembled data object by: obtaining, from the blockchain, metadata to reassemble the data object, obtaining the second set of data from the blockchain and the first set of data from the distributed file system, and generating the reassembled data object using the first set of data and the second set of data based on the metadata.

20 Claims, 15 Drawing Sheets

Related U.S. Application Data

(60) Provisional application No. 62/743,468, filed on Oct. 9, 2018.

(51) Int. Cl.

| | | |
|---|---|---|
| *G06F 21/64* | (2013.01) | |
| *G06Q 30/0601* | (2023.01) | |
| *G06T 19/00* | (2011.01) | |
| *G06V 10/10* | (2022.01) | |
| *G06V 10/22* | (2022.01) | |
| *G06V 10/764* | (2022.01) | |
| *G06V 10/82* | (2022.01) | |
| *G06V 10/98* | (2022.01) | |
| *G06V 20/20* | (2022.01) | |
| *H04L 9/32* | (2006.01) | |
| *H04L 9/00* | (2022.01) | |

(52) U.S. Cl.
CPC ..... *G06F 16/2379* (2019.01); *G06Q 30/0603* (2013.01); *G06T 19/006* (2013.01); *G06V 10/17* (2022.01); *G06V 10/235* (2022.01); *G06V 10/764* (2022.01); *G06V 10/82* (2022.01); *G06V 10/993* (2022.01); *G06V 20/20* (2022.01); *H04L 9/3239* (2013.01); *H04L 9/3247* (2013.01); *G06Q 30/0601* (2013.01); *G06T 2200/21* (2013.01); *H04L 9/50* (2022.05)

(56) References Cited

U.S. PATENT DOCUMENTS

| | | |
|---|---|---|
| 2010/0257598 A1 | 10/2010 | Demopoulos et al. |
| 2014/0032263 A1 | 1/2014 | Kalikivayi et al. |
| 2016/0098723 A1 | 4/2016 | Feeney |
| 2016/0269182 A1 | 9/2016 | Sriram et al. |
| 2017/0046806 A1 | 2/2017 | Haldenby et al. |
| 2017/0300627 A1 | 10/2017 | Giordano et al. |
| 2017/0364701 A1 | 12/2017 | Struttmann |
| 2018/0018723 A1 | 1/2018 | Nagla et al. |
| 2018/0075527 A1 | 3/2018 | Nagla et al. |
| 2018/0082290 A1 | 3/2018 | Allen et al. |
| 2018/0139056 A1 | 5/2018 | Imai et al. |
| 2019/0012666 A1 | 1/2019 | Krauss et al. |
| 2019/0018887 A1 | 1/2019 | Madisetti et al. |
| 2019/0057382 A1* | 2/2019 | Wright ............... H04L 9/0637 |
| 2019/0108482 A1 | 4/2019 | Vikas et al. |
| 2019/0318117 A1* | 10/2019 | Beecham ............ H04L 9/3239 |
| 2019/0370500 A1 | 12/2019 | Lee et al. |
| 2020/0110728 A1 | 4/2020 | Semenov et al. |
| 2021/0157797 A1 | 5/2021 | Dutchak et al. |

FOREIGN PATENT DOCUMENTS

| | | |
|---|---|---|
| CN | 109243583 A | 1/2019 |
| WO | 2018/127511 A1 | 7/2018 |
| WO | 2020/076617 A1 | 4/2020 |

OTHER PUBLICATIONS

Communication under Rule 71(3) EPC received for European Patent Application No. 19791402.1, mailed on Aug. 22, 2023, 9 pages.

Office Action received for Chinese Patent Application No. 201980066996.7, mailed on Aug. 12, 2023, 7 pages (Official Copy Only).

European Search Report and Search Opinion received for European Application No. 23217022.5, mailed on Mar. 14, 2024, 8 pages.

Notice of Allowance received for Chinese Patent Application No. 201980066996.7, mailed on Feb. 4, 2024, 4 pages (2 pages of Original OA and 2 pages of English Translation).

* cited by examiner

242 ↙

OBJECT ORIGINATOR ENVIRONMENT CREATES AN OBJECT DATA BLOCK FOR AN OBJECT, e.g. data object, listing, web page, database, application, etc., WITH ADDRESS FOR EACH NONCRITICAL DATA ELEMENT, e.g. graphics, text, etc.
320

OBJECT DATA BLOCK STATE  322

ID
Critical_content
data_element1(addr_1)
data_element2(addr_2)
data_element3(addr_3)
data_element4(addr_4)
Metadata
OBJECT_owner_signature

OBJECT DATA BLOCK    324

METHODS

Store(ID, data_element[n], n_files) /* Called by object origination entity to create data block files in distributed database with addresses for data files */
{
Metadata = (Object metadata)
Critical_content = (Critical content for object)
for 1, n_files {
    create(data block file in distributed database)
    data_element[n].addr = address to data file
    }

Access(ID) /* Called by entity to access and assemble object based on object data block */
{
    Object[ID].metadata = obj_data_blk.Metadata
    Object[ID].Critical_content =
        obj_data_blk.Critical_content
for 1, n {
    Object[ID].data_element[n] =
        retrieve(obj_data_blk.data_element[n].addr)
    }
}

FIG. 3B

DISTRIBUTED APPLICATION ARCHITECTURES USING BLOCKCHAIN AND DISTRIBUTED FILE SYSTEMS

CROSS-REFERENCE TO RELATED APPLICATIONS

This patent application is a continuation of U.S. patent application Ser. No. 16/396,559, filed Apr. 26, 2019, which claims priority to U.S. Provisional Patent Application No. 62/743,468, filed Oct. 9, 2018. Each of the aforementioned applications is herein incorporated by reference in its entirety for all purposes.

BACKGROUND

In the context of application architectures, an application's end user, such as a seller, buyer or service provider, typically utilizes a variety of data, such as application execution code, images, text, messages, financial and transactional event data. Often, some of the data is important and generally needs to be securely stored and maintained while other data is relatively unimportant.

Data can be securely stored and maintained for long periods in a persistent storage system, such as in a blockchain, but the storage costs can become burdensome and expensive. In contrast, storage of data in a distributed file system, such as the InterPlanetary File System (IPFS), is significantly less expensive.

It is with respect to these and other considerations that the disclosure made herein is presented.

SUMMARY

Technologies are disclosed herein for storing data in a distributed application architecture that classifies data into different classes and utilizes multiple storage systems to store data according to the different classes. For example, data can be identified or classified as either critical or durable data or noncritical or disposable data. Data classified as noncritical or disposable can be stored on an inexpensive distributed file system, such as the IPFS. Data classified as critical can be stored in a data block on a blockchain, such as the ETHERIUM blockchain, along with addresses to the noncritical or disposable data on the distributed file system. The data can be retrieved for use by accessing the data block on the blockchain to obtain the critical data and using the addresses to the distributed file system to retrieve the noncritical data.

In one example of the disclosed technology, data is stored for a listing by identifying a first set of data and a second set of data in a listing and storing each element of the first set of data in a data block file on a distributed file system, the data block file having an address on the distributed file system. An object data block is created on a blockchain, where the object data block includes the second set of data and the address on the distributed file system for each element of the first set of data. The object data block is committed to the blockchain.

In certain examples, the first set of data can be a graphical element, promotional text, image data or video data for the listing and the second set of data can be an identifier for the listing, an identifier of an owner of the listing, a price, a description of goods or services, terms of a sale, parties to the sale, date of the sale, a sales platform identifier, a payment status, a date of shipping or a confirmation of delivery. In particular examples, the first and second sets of data are differentiated by a data definition for the listing or by an algorithmic analysis of the listing. In some examples, the distributed file system can delete the data block files for the first set of data.

Other examples involve, responsive to a request for the listing from a requestor, retrieving the object data block for the listing from the blockchain and, for each element of the first set of data, obtaining the data block file for the element using the address on the distributed file system in the object data block. The second set of data is obtained from the object data block and the listing reassembled from the first and second sets of data to create a reassembled listing, which is returned to the requestor. In some examples, the first set of data can include graphical elements in the distributed file system the reassembled listing is processed for display. In yet other examples, metadata and the reassembled listing is processed for display utilizing the metadata in the object data block.

Another example of the disclosed technology for storing a data object operates by identifying a first set of data and a second set of data in the data object. Each element of the first set of data is stored in a data block file for the element on a distributed file system, where the data block file has an address on the distributed file system. An object data block is created on a blockchain, the object data block including the second set of data and the address on the distributed file system for the data block file for each element of the first set of data. The object data block is committed to the blockchain.

In particular examples, the first set of data can be elements of critical data and the second set of data can be elements of noncritical data. In certain examples, the first and second sets of data can be differentiated by a data definition for the data object or an algorithmic analysis of the data object. In some examples, the distributed file system can delete the data block files for the first set of data.

In other examples, responsive to a request for the listing from a requestor, the object data block for the data object is retrieved from the blockchain. For each element of the first set of data, the data block file for the element can be obtained using the address on the distributed file system in the object data block. The second set of data can be obtained from the object data block. The data object is reassembled from the first and second sets of data to create a reassembled data object, which is returned to the requestor.

In particular examples, the first set of data includes one or more graphical elements in the distributed file system and the reassembled data object is processed for display. In certain other examples, XML metadata for the data object is stored in the object data block and the reassembled data object is processed for display of the listing utilizing the XML metadata in the object data block.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

FIG. 3B is a data architecture diagram showing an illustrative example of an object data block on a distributed application architecture using blockchain and distributed file systems that includes code for methods for storing and assembling objects maintained on the distributed application architecture using blockchain and distributed file systems in accordance with aspects of the disclosed technology;

DETAILED DESCRIPTION

Figure 1:
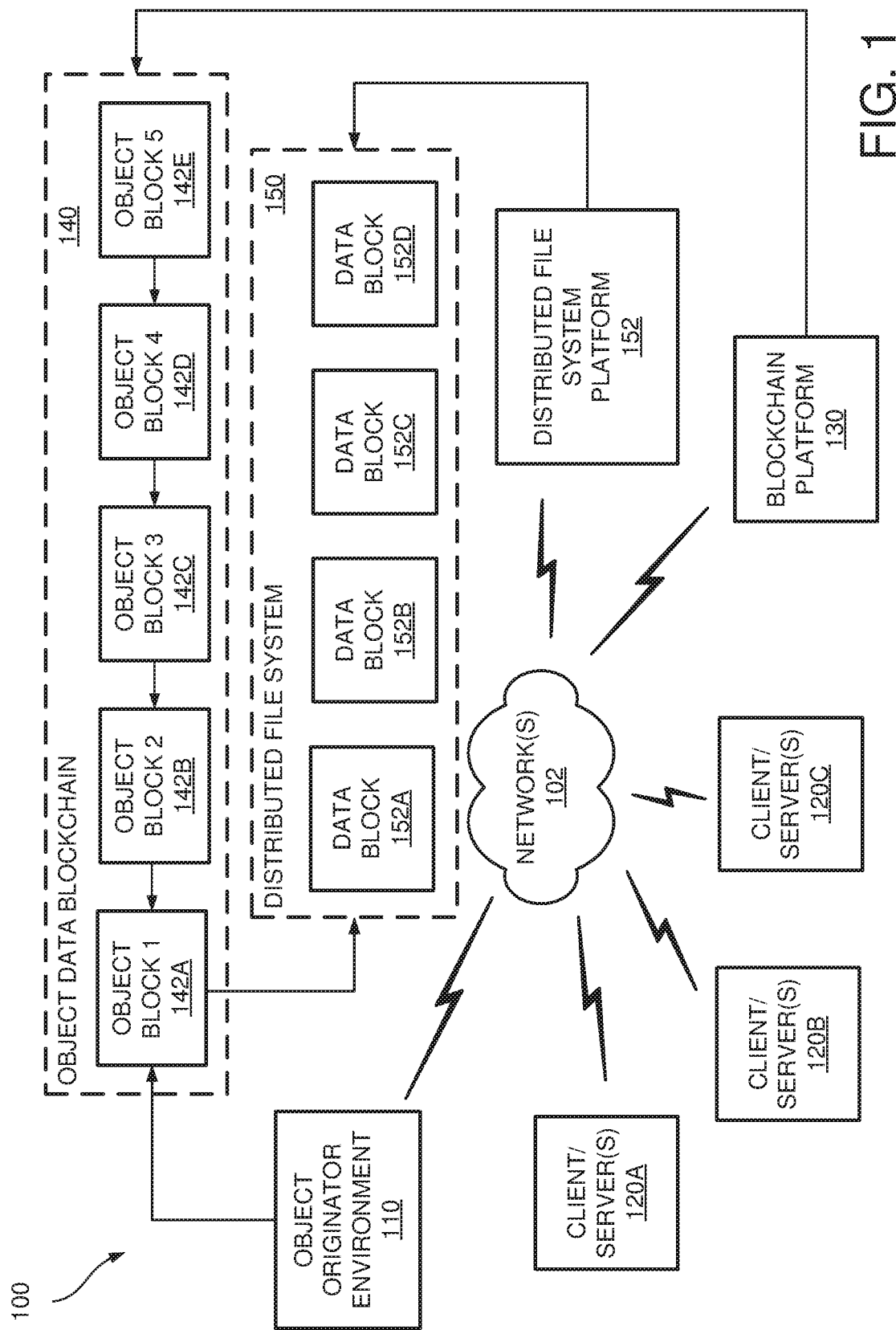
FIG. 1 is an architectural diagram showing an illustrative example of a system for a distributed application architecture using an object data blockchain and a distributed file system.

In the context of data storage, conventional systems, such as e-commerce, e-tailing, digital media distribution and broadcast platforms, often store data in a manner that is secure, but in a manner that is inefficient or unnecessarily expensive for some data. On the other hand, storing data in an inexpensive distributed file system is unsuitable for important data.

Examples of important data in certain contexts can include data regarding operations, scheduling, transactions, rating, transfers of custody or ownership. In other examples, important data can include contracts, market value distributions, money creation, incentive management and related contracts. Examples of relatively unimportant data can include images, video and promotional text. Application execution code, user interface or resources can also be relatively unimportant because the application is often distributed by a central authority, such as a commerce site or an application store.

For example, in a product listing on an online electronic commerce website, data regarding a description of goods, terms of sale, parties to the sale, date of sale, shipping and delivery can be highly important. Images or video of the product and graphics or promotional text may be less important.

In the context of storing application data, it can be advantageous to store data for a data object in a distributed application architecture that stores different classes of data in different storage system according to class. For example, a distributed application architecture classifies data in the object as either critical data or noncritical data. Data classified as noncritical can be stored on an inexpensive distributed file system, such as the IPFS. Data classified as critical or durable can be stored in an object data block on a blockchain, such as the ETHERIUM blockchain, along with addresses to the data files on the distributed file system for noncritical data elements. The data for the object can be retrieved for use by accessing the object data block for the object on the blockchain to obtain the durable data and using the addresses to the distributed file system to retrieve the noncritical data.

A technical advantage of the disclosed technology is that it provides more efficient and cost-effective storage of data for objects that nonetheless securely and persistently stores important data. The disclosed technology utilizes an immutable object data block secured on a blockchain to secure important data that needs to be persistent, but stores less important, noncritical data in a relatively inexpensive distributed file system. By storing different classes of data in different storage system, the disclosed technology can permanently store important persistent data while less important data is cost-effectively stored in a distributed file system. The data for a data object stored in a distributed application architecture in accordance with the disclosed technology can be widely accessible to entities wishing to access and assemble the object.

Other technical effects other than those mentioned herein can also be realized from implementation of the technologies disclosed herein.

The following Detailed Description describes technologies for a distributed application architecture utilizing a blockchain for critical or durable data and a distributed file system for noncritical data. A distributed application architecture using a blockchain and distributed file system can be established by a data object originator entity using a data object originator environment to store critical or durable data for the object in an object data block on a blockchain along with addresses for noncritical data elements stored in a distributed file system. The blockchain can be a private blockchain or an existing blockchain, such as the ETHERIUM blockchain.

As will be described in more detail herein, it can be appreciated that implementations of the techniques and technologies described herein may include the use of solid state circuits, digital logic circuits, computer components, and/or software executing on one or more input devices. Signals described herein may include analog and/or digital signals for communicating a changed state of the data file or other information pertaining to the data file.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including multiprocessor systems, mainframe computers, microprocessor-based or programmable consumer electronics, minicomputers, hand-held devices, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for a distributed application architecture using blockchain and distributed file systems ledger will be described. As will be described in more detail below with respect to the figures, there are a number of applications and services that may embody the functionality and techniques described herein.

FIG. 1 is an architectural diagram showing an illustrative example of a distributed application architecture system 100 utilizing an object data blockchain 140 supported by a blockchain platform 130 and distributed file data system 150 supported by a distributed file system platform 154. A distributed application architecture using object data blockchain 140 can be utilized to securely maintain critical or durable data in object data blocks 142 while less important or non-essential data is inexpensively stored in noncritical data files in distributed file system 150. Both the object data blockchain 140 and the distributed file data system 150 can provide wide access to object data through network 102.

In the embodiment of FIG. 1, object data blockchain 140 can be a publicly available blockchain that supports scripting, such the ETHEREUM blockchain, which supports a SOLIDIFY scripting language, or BITCOIN, which supports a scripting language called SCRIPT.

Distributed file system 150 can be the IPFS system, which proves a content-addressable, peer-to-peer method for storing and sharing data. IPFS is a decentralized file sharing platform that can be useful for storing large files.

A large data file stored in the IPFS is broken into blocks of data, where each block of data is identified by a cryptographic hash computed from the content of the block of data, and the blocks of data are stored in the peer-to-peer nodes of the IPFS. IPFS removes duplications across the network. Each network node stores limited content in which it is interested along with indexing information that can be used to determine which node is storing a block of data. The cryptographic hash essentially serves as an address for the block of data in the IPFS.

IPFS utilizes a distributed hash table (DHT) to obtain file locations, where the DHT is essentially a key-value that uses node identifiers and keys with a distance metric to store and retrieve information. When searching for a value, a node contacts another node that is closer to the key and requests the value from it. The other node replies by returning the value or by referring to nodes that are closer to the key. The process continues until the key is found.

When data is stored in the IPFS, the node storing the data identifies multiple nodes that are closest to the key and provides them with the value. Keys remain valid for a limited period of time and must be updated to remain in the DHT. If the key is not updated, then the key can fall out of the DHT with time and the value for the set of data can become inaccessible and may eventually be deleted from the IPFS. Other suitable distributed file systems may include Storj, FileCoin, and Sia.

A data object originator environment 110, such as a client device, one or more servers, or remote computing resources, is controlled by an originator entity that stores a data object, such as an application, a document, or a listing, in the distributed application architecture of the disclosed technology. In one example, object originator environment 110 creates an object data block 142 for the object on object data blockchain 140 as well as data blocks 152 on distributed file system 150. For a distributed application architecture using blockchain and distributed file systems, a data object corresponding to an object data block 142, in this example, can include content for a product listing that includes critical data, such as price, parties, terms and conditions, and noncritical data, such as image files, graphic files and descriptive text. In this example, the object originator environment 110 creates an object data block 142 that stores critical data along with addresses to data blocks 152 that store noncritical data elements in the data object.

In some embodiments, the object originator environment 110 can be replaced by another computing node, such as a computer on a peer-to-peer network, or other computing device.

In the example of FIG. 1, the data object content is provided by object originator environment 110 and secured on distributed application architecture using blockchain and distributed file systems 140. The information in the data blocks 142 of the blockchain can be made accessible to other entities, such as client/servers 120A, 120B or 120C or blockchain platform 130. In this example, the client/servers 120 can communicate with object originator environment 110 as well as a network of servers for blockchain platform 130 that supports and maintains object data blockchain 140 and the nodes of distributed file system platform 154 that supports distributed file system 150. For example, the ETHERIUM blockchain platform from the ETHERIUM FOUNDATION of Switzerland provides a blockchain computing platform and operating system that provides scripting functionality in the blocks of its blockchain.

In one example, object originator environment 110 owns and controls the object data blocks 142 in the object data blockchain 140. Each object data block 142 includes critical content stored within the object data block along with addresses to data blocks 152 in distributed file system 150 for noncritical data elements of the data object. The object data blocks 142 can, in some examples, also maintain metadata, such as an XML file for the data object that defines the elements and format of a document that includes the critical data and the noncritical data elements.

The object originator environment 110 generates the object data block 142 and data blocks 152 of a data object, but the distributed application architecture using blockchain 140 and distributed file system 150 can be made accessible to other entities, such as client/servers 120, so these entities can access and assemble the data object from the data content stored in the object data blocks 142 and data blocks 152. For example, distributed application architecture using blockchain 140 and distributed file system 150 may be viewable to the public through the use of applications that can access the blockchain information. By providing access to the distributed application architecture using blockchain 140 and distributed file system 150, this approach allows users to readily access and reassemble a data object on the distributed application architecture using blockchain 140 and distributed file system 150.

In another example, aspects of the distributed application architecture using blockchain and distributed file systems 140 may be restricted to being viewable only to entities that are authorized to access the object data blockchain 140, such as entities granted access by object originator environment 110. By restricting access to the object data blockchain 140, an originator entity can preserve greater control or security over the data object content.

Figure 2A:
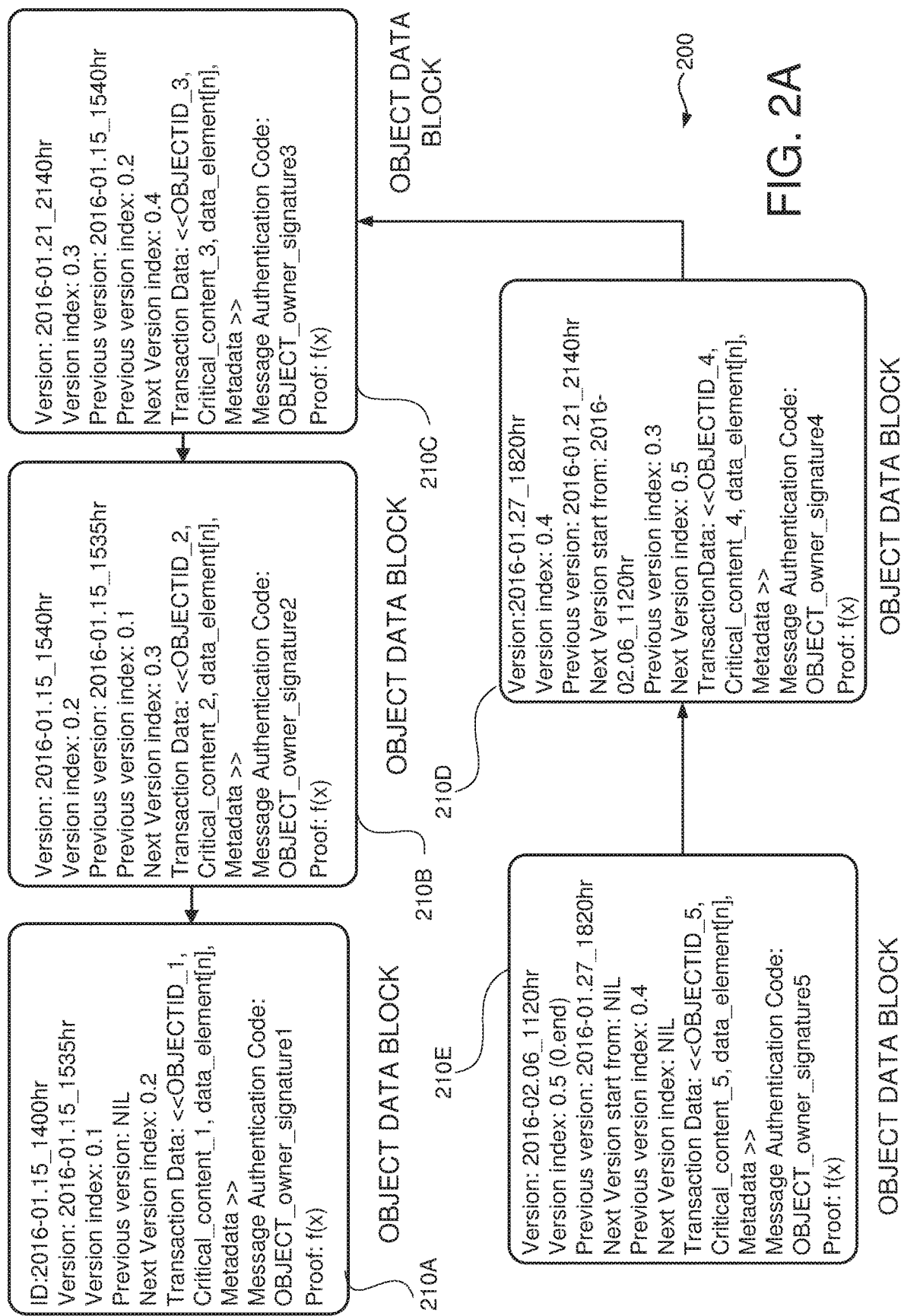
FIG. 2A is a data architecture diagram showing an illustrative example of object data blocks in the object data blockchain of FIG. 1 in accordance with certain aspects of the disclosed technology.

FIG. 2A is a data architecture diagram illustrating a simplified example of an object data blockchain ledger utilized by the distributed application architecture based on the blocks 142A-E of object data blockchain 140 of FIG. 1. The object data blockchain ledger 200 example of FIG. 2A is simplified to show block headers, representative content and signatures of blocks 210A-E in order to demonstrate storage of data objects using a blockchain. In outline, a blockchain ledger may be a globally shared transactional database. Signatures can, in some examples, involve all or part of the data stored in the data the blocks 142A-E and can also involve public key addresses corresponding to entities involved in the distribution, e.g. an originator entity.

The blockchain ledger 200 may be arranged as a Merkle tree data structure, as a linked list, or as any similar data structure that allows for cryptographic integrity. The blockchain ledger 200 allows for verification that the data object and associated data has not been corrupted or tampered with because any attempt to tamper will change a Message Authentication Code (or has) of a block, and other blocks pointing to that block will be out of correspondence. In one embodiment of FIG. 2A, each block may point to another block. Each block may include a pointer to the other block, and a hash (or Message Authentication Code function) of the other block.

Each block in the blockchain ledger may optionally contain a proof data field. The proof data field may indicate a reward that is due. The proof may be a proof of work, a proof of stake, a proof of research, or any other data field indicating a reward is due. For example, a proof of work may indicate that computational work was performed. As another example, a proof of stake may indicate that an amount of cryptocurrency has been held for a certain amount of time. For example, if 10 units of cryptocurrency have been held for 10 days, a proof of stake may indicate 10*10=100 time units have accrued. A proof of research may indicate that research has been performed. In one example, a proof of research may indicate that a certain amount of computational work has been performed—such as exploring whether molecules interact a certain way during a computational search for an efficacious drug compound.

The blocks 210 of distributed application architecture using blockchain and distributed file systems 200 in the example of FIG. 2A show securing a data object with each new object data block 210 on the blockchain 200. In one example, object originator environment 110 of FIG. 1 identifies the critical and noncritical data elements in the data object. The object originator environment stores in an object data block 210 for the data object the noncritical data elements in a distributed file system and stores an object identifier, the critical data, and an address in the distributed file system for each stored noncritical data element. The object originator environment can also store metadata for the data object in the object data block 210. The object originator environment 110 signs the object data block 210 and the blockchain system within which blockchain 200 is created verifies the object data block based on a proof function.

Note that a variety of approaches may be utilized that remain consistent with the disclosed technology. In some examples, the user of object originator environment 110 is the only entity permitted to verify or validate object data blocks 142 on the blockchain. In other examples, other entities, such as authorized entities, can verify or validate object data blocks.

In the example of FIG. 2A, Critical_content, such as durable data that needs to be persisted, is stored in the object data blocks 142. In the example of FIG. 2A, each object data block 210 contains content for a different data object. To add an object data block with new data object for distribution, object originator environment creates object data block 210B, which identifies the object, e.g. OBJECTID_2, the critical content Critical_content_2, the storage addresses for noncritical data elements data_element[n], and metadata for the object, and links block 210B to block 210A. The object originator environment 110 signs object data block 210B and commits block 210B to blockchain 200 for verification by the blockchain platform.

To store another data object in the distributed application architecture, object originator environment 110 creates object data block 210C to secure data object OBJECTID_3 along with Critical_content_3, the storage addresses for noncritical data elements, and metadata. Similarly, object data block 242D is created by object originator environment 110 to store data object OBJECTID_4 and object data block 242E is created to store data object OBJECTID_5.

Figure 2B:
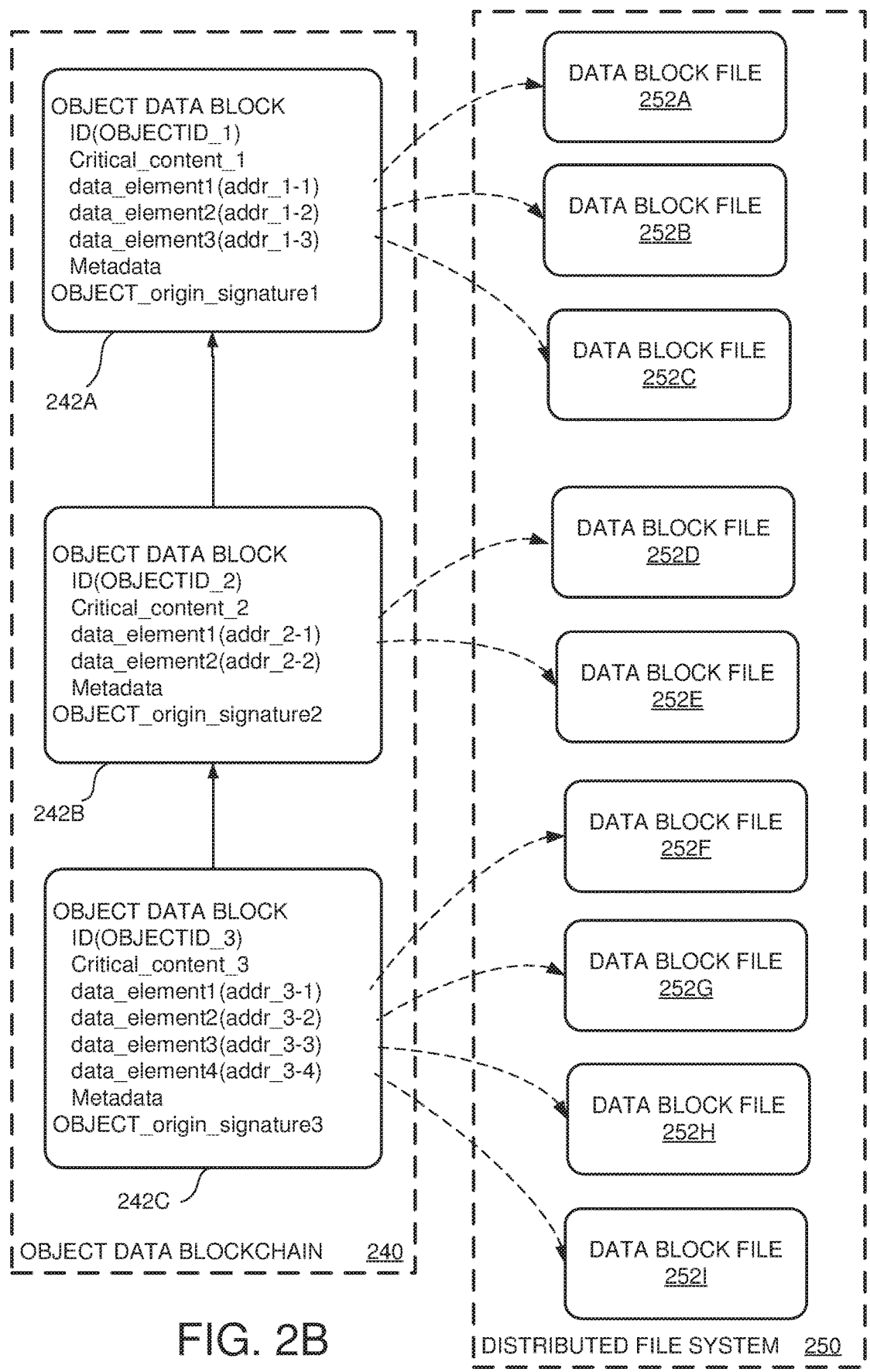
FIG. 2B is a data architecture diagram showing another illustrative example of a distributed application architecture using an object data blockchain and a distributed file system where each object data block on the blockchain stores durable content and addresses for data files on a distributed file system.

FIG. 2B is a data architecture diagram showing another illustrative example of a distributed application architecture using object data blockchain 240 and distributed file system 250. The object data blocks 242 store the critical content for the object along with addresses in distributed file system 250 for data block files 252 that store noncritical data elements.

Object data blocks 242 may also stores the public key for the originator entity and metadata for the data object, e.g. an XML file.

A distributed application architecture using blockchain and distributed file systems, such as object data blockchain 140 in FIG. 1 or blockchain 240 in FIG. 2B, enables critical data for a data object to be securely stored on an object data blockchain and noncritical data elements of the data object to be stored in distributed file system 250. Thus, the security and scripting capability of a blockchain can be utilized in concert with the cost-effective and widely accessible storage of a distributed file system.

Figure 3A:
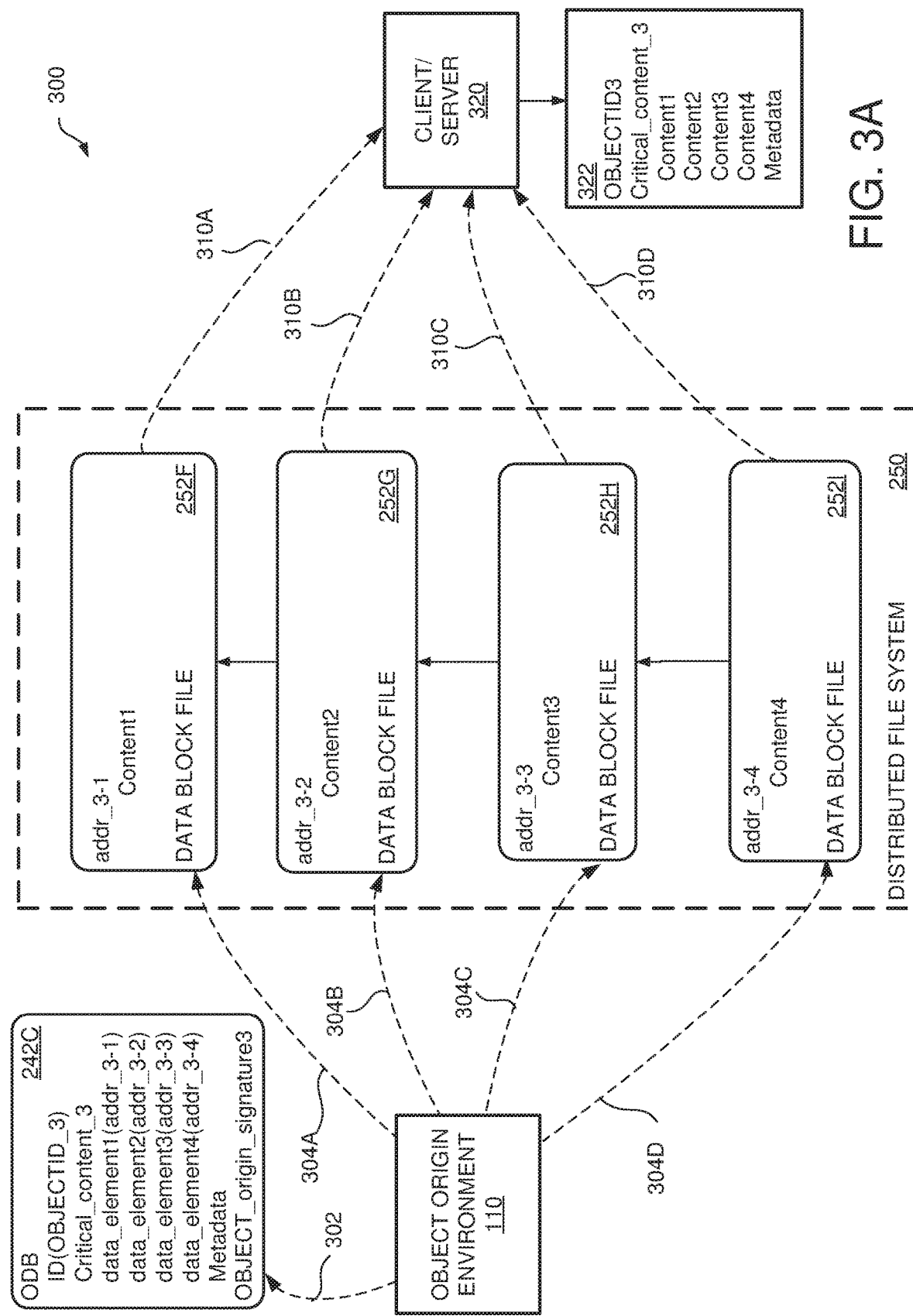
FIG. 3A is a data architecture diagram showing an illustrative example of object originator environment creating a distributed application architecture object data block and data files in accordance with aspects of the disclosed technology.

FIG. 3A is a data architecture diagram showing a simplified illustrative example for storing a data object in a distributed application architecture in accordance with the disclosed technology. In this example, which is based on object data block 242C of FIG. 2B, object originator environment 110 decomposes a data object into critical content data and noncritical data elements. Object originator environment 110 creates object data block 242C, which includes an identifier for the data object OBJECTID_3 and the critical data content Critical_content_3.

Object data block 242C can also include metadata for the data object, such as a time stamp or formatting information. For example, the metadata can include an XML file that describes how the critical data content and noncritical data elements are formatted and rendered for display to a user.

Object originator environment 110 stores each of the noncritical data elements in data block files 252 in distributed file system 250, where a hashed value of the content of each noncritical data element serves as an address for the corresponding data block file in the file system 250. Object originator environment 110 hashes the content of data_element1 to obtain address value addr_3-1 and, at 304A, creates data block file 252F with the content Content1 of data_element1 and stores the block in distributed file system 250 in association with the address value addr_3-1. The address addr_3-1 for data block file 252F is stored in object data block in association with data_element1, e.g. data_element1(addr_3-1).

Similarly, object originator environment 110 hashes the content of data_element2 to obtain address value addr_3-2 and, at 304B, creates data block file 252G with the content Content2 of data_element2 and stores the block in distributed file system 250 in association with the address value addr_3-2. The address addr_3-2 for data block file 252G is stored in object data block in association with data_element2, e.g. data_element2(addr_3-2).

Likewise, object originator environment 110 hashes the content of data_element3 to obtain address value addr_3-3 and, at 304C, creates data block file 252H with the content Content3 of data_element3 and stores the block in distributed file system 250 in association with the address value addr_3-3. The address addr_3-3 for data block file 252H is stored in object data block in association with data_element3, e.g. data_element3(addr_3-3).

Finally, object originator environment 110 hashes the content of data_element4 to obtain address value addr_3-4 and, at 304D, creates data block file 252I with the content Content4 of data_element4 and stores the block in distributed file system 250 in association with the address value addr_3-4. The address addr_3-4 for data block file 252I is stored in object data block in association with data_element4, e.g. data_element4(addr_3-4).

As a result of storing the data object in a distributed application architecture in accordance with the disclosed technology, the amount of data stored in object data block 242C on object data blockchain 240 for data object OBJECTID_3, is significantly reduced in comparison to the original size of the data object. The noncritical data elements, which can often represent a significant portion of the data for a data object, are stored in data blocks 252 in the relatively inexpensive storage of distributed file system 250.

Also, in the example of FIG. 3A, client/server 320 reconstructs data object OBJECTID_3 utilizing object data block 242C. Client/server 320 retrieves object data block 242C from object data blockchain 240, which contains the Critical_content_3 and metadata.

Using the address stored for each noncritical data element in object data block 242, client/server 320 retrieves the corresponding data block file 252 from distributed file system 250. At 310A, client/server 320 uses address addr_3-1 to retrieve data block file 252F with Content1. At 310B, client/server 320 uses address addr_3-2 to retrieve data block file 252G with Content2. At 310C, client/server 320 uses address addr_3-3 to retrieve data block file 252H with Content3. At 310D, client/server 320 uses address addr_3-4 to retrieve data block file 252I with Content4.

Using the critical data from object data block 242C and the noncritical data elements from data block files 252F-I, client/server 320 is able to create a reconstruction 322 of data object OBJECTID3. Because the object data block 240 and distributed file system 250 are both widely accessible, practically any client/server device in communication with the Internet can quickly and efficiently reconstruct the data object.

In the example of FIG. 3A, access to a data object can be controlled by an originator entity utilizing the object originator environment 110 by controlling access to the object data block for the data object. For example, the object originator environment can encrypt the content of the object data block using a first key of a key pair and only providing the second key of the key pair to an authorized entity to decrypt the content. The disclosed technology enables the critical content of data objects to be securely stored and distributed using blockchain 240, which is widely accessible via the Internet. The blockchain platform supporting the object data blockchain of the disclosed distributed application architecture ensures the integrity of the critical content of a data object. The disclosed technology enables noncritical content to be inexpensively and efficiently stored in distributed file system 250, which is also widely accessible via the Internet.

Scripts for distribution, access and verification of the data object can be secured by the object data blocks 242 of using blockchain 240 and executed by the operating system of the decentralized, distributed blockchain platform. FIG. 3B is a data architecture diagram showing an illustrative example of object data block 242 that includes examples of the Store and Access and assemble scripts. Also shown is a process 320 in an object originator environment that invokes the Store script to create an object data block 242 and populate the data. An example of block state 322 defined for the distributed application architecture data block 242 is also shown.

In this example, the Store script is called by the originator entity using object originator environment 110 to create an object data block for an object. In this example, the Store script populates the Metadata for the object data block from the metadata of the data object and stores the critical content for the data object in Critical_content. The script then creates a data block file for each noncritical data element in the data object and stores the address of the data block file in the corresponding data_element.addr field.

Note that the parsing of critical and noncritical data in a data object can be performed in a variety of manners that are consistent with the disclosed technology. In one example, the critical and noncritical elements are defined by a developer in creating a data object. In other examples, the critical and noncritical elements may be differentiated algorithmically based on element types, usage, etc. It should be appreciated that many variations can be utilized that are in accordance with the approach of the disclosed technology.

The example of FIG. 3B also shows the Access and assemble script, which is called by an entity to reconstruct the data object from the object data block for the data object and the data block files from the distributed file system. In this example, the metadata and Critical_content from the object data block is used in the reconstruction. For each noncritical data element, the address stored in the object data block for each data element is used to retrieve the corresponding data block for the element. As a result, the original data object is reconstructed from the data stored in the object data block and distributed file system in accordance with the disclosed technology.

In one example, the metadata can define formatting and structure for a data object such as a web page with a product listing. The metadata can be utilized to reconstruct the format of the original data object for rendering. For example, the metadata can define where the critical data is rendered in the web page and where the noncritical data elements are inserted into the web page. The resulting reconstructed data object can then be rendered for display to a user in essentially its original form.

Figure 4A:
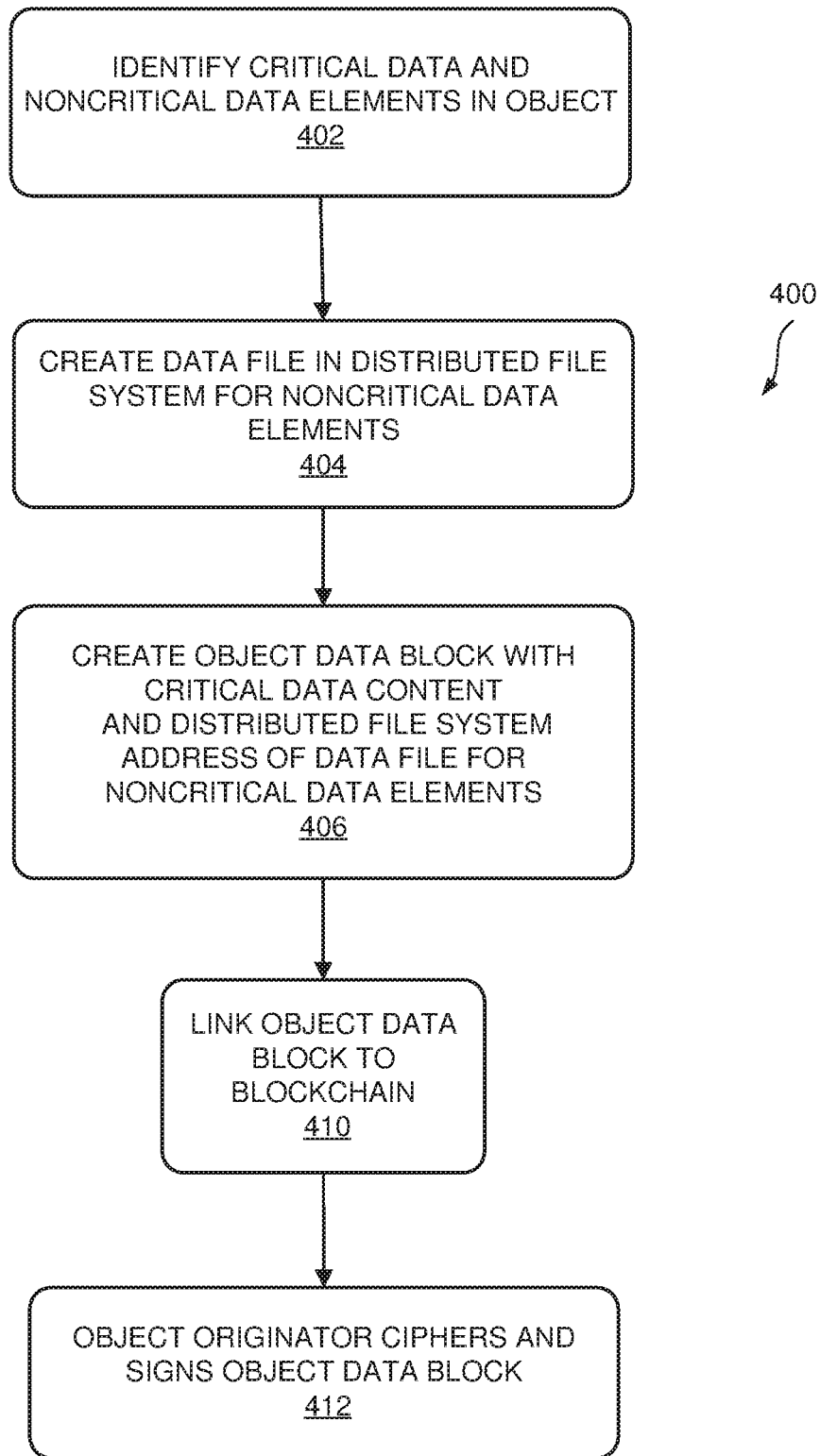
FIG. 4A is a control flow diagram showing an illustrative example of a process for an object originator environment entity to store a data object in a distributed application architecture in accordance with aspects of the disclosed technology.

FIG. 4A is a control flow diagram showing an illustrative example of a process 400, such as a process in object originator environment 110, for storing a data object in the distributed application architecture of the disclosed technology. At 402, the critical data and noncritical data elements in the data object are identified. As noted above, the critical data can be identified in a definition for the data object, tagged by a user, or determined algorithmically. At 404, a data block file, such as the data block files 252 shown in FIGS. 2B and 3A, is created in the distributed file system for one or more noncritical data elements, where each data block file has an address associated with it.

At 406, an object data block, such as object data blocks 242 shown in FIGS. 2B and 3A, is created that includes an identifier for the data object, the critical data content and the distributed file system address of the data file for the noncritical data elements. The object data block can also include metadata for the data object. The content of the object data block can be encrypted by the object originator to control access to the object data block.

At 410, the object data block is linked to a blockchain, such as object data blockchain 240 shown in FIGS. 2B and 3A. The object originator ciphers and signs the object data block, which will be validated by the blockchain platform for the blockchain. At this point, the data object is stored in a distributed application architecture in accordance with the disclosed technology.

Figure 4B:
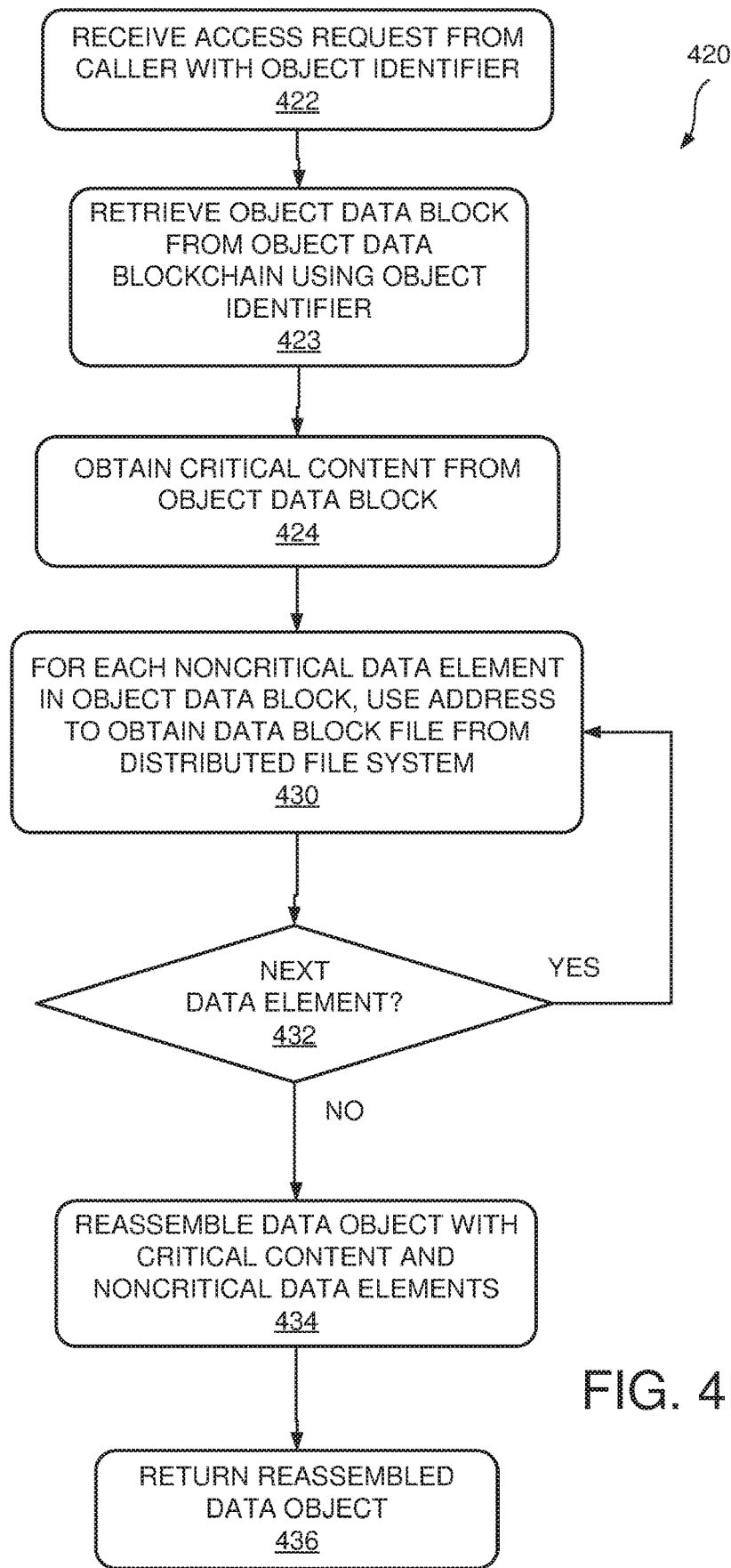
FIG. 4B is a control flow diagram showing an illustrative example of a process for transferring access to a user entity using a distributed application architecture data block on a distributed application architecture using blockchain and distributed file systems in accordance with aspects of the disclosed technology.

FIG. 4B is a control flow diagram showing an illustrative example of a process 420, such as a process in one of client/servers 120, for reconstructing or reassembling a data object stored in a distributed application architecture in accordance with the disclosed technology. At 422, a request to access a data object is received that includes an object identifier for the object. At 423, using the object identifier, the object data block for the object is retrieved from the object data blockchain where the object data block is stored.

The data object is reassembled based using the object data block. At 424, the critical content from the object data block is obtained. At 430, for each noncritical data element in the object data block, the address stored for the data object is used to obtain the data block file for the data element from the distributed file system. At 432, the process continues to obtain the data block file for each data element defined in the object data block.

At 434, the critical content and the data block files for the noncritical elements are used to reassemble the data object. In some examples, metadata stored in the object data block can be used to reassemble the data object. At 436, the reassembled data object is returned to the requesting entity. Thus, in accordance with certain aspects of the disclosed technology, a data object stored in a distributed application architecture can be retrieved and reassembled.

Note that some distributed file systems can be configured to not permanently stored data block files. For example, if a data block file is over a certain age or has not been accessed for a period of time, the data block file may be removed from the file system. The IPFS, for example, does not guarantee that content will be stored permanently, but does guarantee that an address for specific content stored in the IPFS will remain unchanged. When seeding of data in the IPFS ceases, the data will be cleared over time from IPFS nodes if no request is made to access the data. By distinguishing critical and noncritical data in a data object and differentially storing the critical data in a blockchain and noncritical data in a distributed file system, certain aspects of the disclosed technology can accommodate a non-permanent distributed file system because the critical data in the data object is permanently and immutable maintained on a blockchain.

Figure 4C:
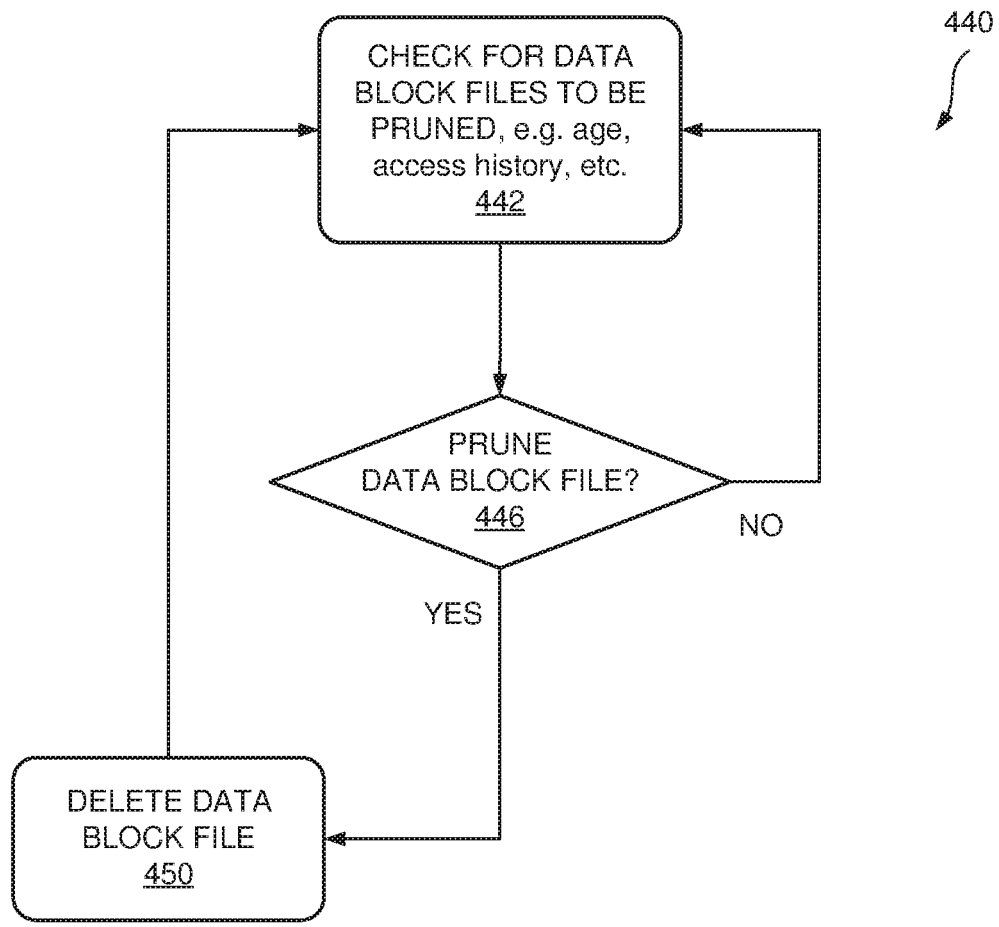
FIG. 4C is a control flow diagram illustrating an example of a process for assembling a data object stored from an object data block in accordance with aspects of the disclosed technology.

FIG. 4C is a control flow diagram illustrating an example of a pruning process 440, such as a process in one or more nodes of distributed file system platform 154, the removes data block files. At 442, a check is performed for data block files to be pruned, e.g. based on age, access history, etc. If a data block file is found, then control branches at 446 to 450 to delete the data block file. Control can return to 442 to continue checking for data block files to be pruned. If no data block file is found to be pruned, then control can return to 442 to repeat the check, such as e.g. periodically or when free storage capacity for the node falls below a threshold level.

Thus, in certain examples, the noncritical data for a data object that is stored in data block files in accordance with the present technology may be eroded over time. Nonetheless, the critical data remains securely stored in an object data block for the data object. In some implementations, a non-permanent distributed file system may be selected by design to allow noncritical data elements to erode over time.

It should be appreciated that the processes shown and discussed above are examples and a variety of other approaches may be utilized without departing from the disclosed technology.

Depending upon the scripting capabilities of the blockchain platform, the object data blocks of the distributed application architecture stored using a blockchain may include more extensive code execution. For example, a distributed application architecture system that provides for shared access control to the data objects by multiple users may require more extensive code execution capability in the blockchain than a distributed application architecture system that limits access control to a single user, e.g. the object originator entity. Similarly, a distributed application architecture system that encrypts and decrypts the data stored in the object data blocks may require more extensive code execution capability in the blockchain.

It should be appreciated that the utilization of blockchain technology, such as scripting technology within smart contracts, in this context provides a high degree of flexibility and variation in the configuration of implementations without departing from the teachings of the present disclosure.

Note that the disclosed technology may be applied to storing of a variety of types of data objects, such as data objects in applications, databases, web pages, or product listings. The technology may be applied to efficiently and cost-effectively store different classes of data.

Figure 5:
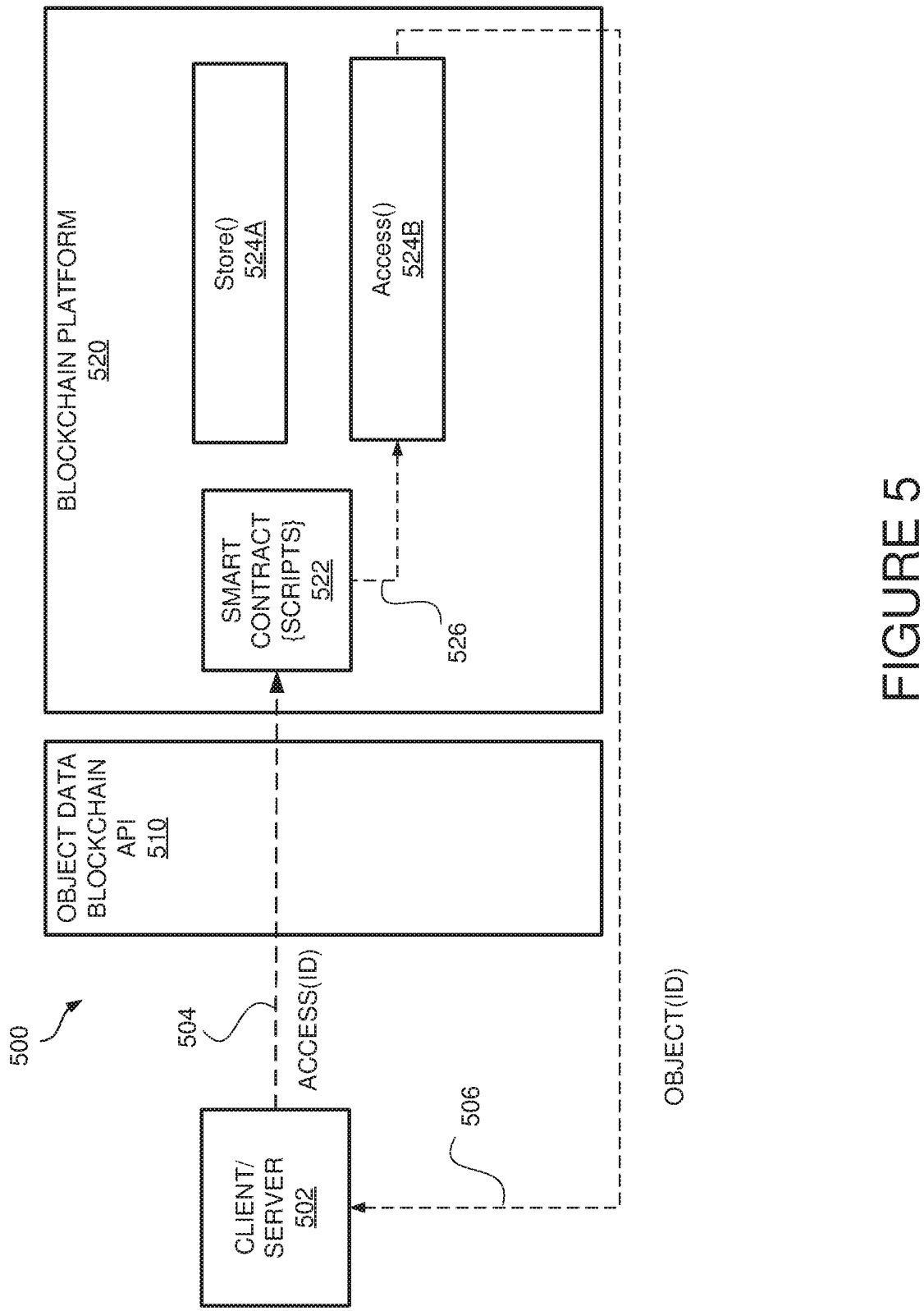
FIG. 5 is a data architecture diagram showing an illustrative example of a user using an application programming interface to access and assemble a data object from a distributed application architecture using blockchain and distributed file systems in accordance with aspects of the disclosed technology.

FIG. 5 is a data architecture diagram showing an illustrative example of an interface for accessing a distributed application architecture using blockchain and distributed file systems through a script in an object data block, such as object data blocks 142 in object data blockchain 140 in FIG. 1, object data blocks 210 in blockchain 200 in FIG. 2A, or object data blocks 242 in blockchain 240 in FIGS. 2B, 3A and 3B. In this example, an evaluation Application Program Interface (API) 510 provides an interface to the blockchain platform 520 that supports the distributed application architecture using blockchain and distributed file systems in accordance with the disclosed technology. The blockchain platform 520 supports a smart contract 522, such as object data block 242 in FIG. 3B, which includes scripts 524 with code that, when executed by the blockchain platform 520, performs operations with respect to the distributed application architecture using blockchain and distributed file systems.

In the example of FIG. 5, two scripts are defined in smart contract 522. The Store script 524A permits an object originator entity for a data object to store the data object in the object data blockchain and distributed file system of the distributed application architecture of the disclosed technology. The Access script 524B provides for a user to request access to data object stored in the distributed application architecture.

In the example of FIG. 5, a user of client/server 502, sends an access request 504 with an object identifier through the object data blockchain API 510 to smart contract 522 to invoke, at 526, the Access script 524B. The Access script obtains the object data block for the data object and, using the addresses for noncritical data elements in the object data block, retrieves data block files from the distributed file system. The Access script assembles the critical data from the object data block and the noncritical data from the data block files to create a reassembled data object, which is returned, at 506, to client/server 502.

Blockchain Ledger Data Structure

Figure 6A:
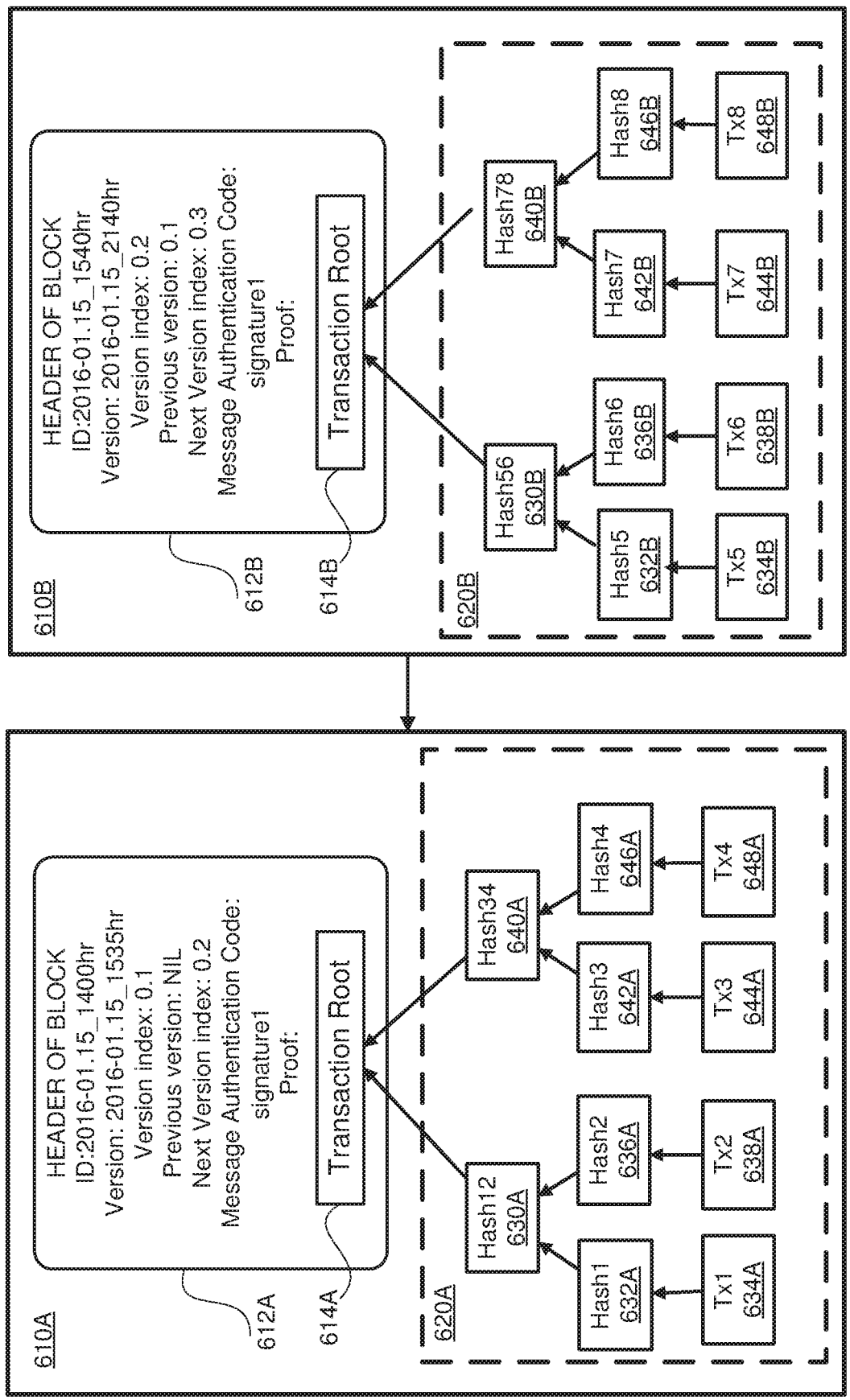
FIG. 6A is a data architecture diagram illustrating a simplified example of a blockchain ledger based on the object data blocks of the distributed application architecture using the object data blockchain and distributed file systems of FIG. 1.

FIG. 6A is a data architecture diagram illustrating a simplified example of a blockchain ledger 600 based on the blocks 142A-E of the distributed application architecture using blockchain and distributed file systems 140 of FIG. 1. The blockchain ledger 600 example of FIG. 6A is simplified to show block headers, metadata and signatures of blocks 210A-E in order to demonstrate a secure distributed application architecture using a blockchain. In outline, a blockchain ledger may be a globally shared transactional database.

FIG. 6A is an illustrative example of a blockchain ledger 600 with a data tree holding transaction data that is verified using cryptographic techniques. In FIG. 6A, each block 610 includes a block header 612 with information regarding previous and subsequent blocks and stores a transaction root node 614 to a data tree 620 holding transactional data. Transaction data may store smart contracts, data related to transactions, or any other data. The elements of smart contracts may also be stored within transaction nodes of the blocks.

In the example of FIG. 6A, a Merkle tree 620 is used to cryptographically secure the transaction data. For example, Transaction Tx1 node 634A of data tree 620A of block 610A can be hashed to Hash1 node 632A, Transaction Tx2 node 638A may be hashed to Hash2 node 636A. Hash1 node 632A and Hash2 node 636A may be hashed to Hash12 node 630A. A similar subtree may be formed to generate Hash34 node 640A. Hash12 node 630A and Hash34 node 640A may be hashed to Transaction Root 614A hash sorted in the data block 610A. By using a Merkle tree, or any similar data structure, the integrity of the transactions may be checked by verifying the hash is correct.

Figure 6B:
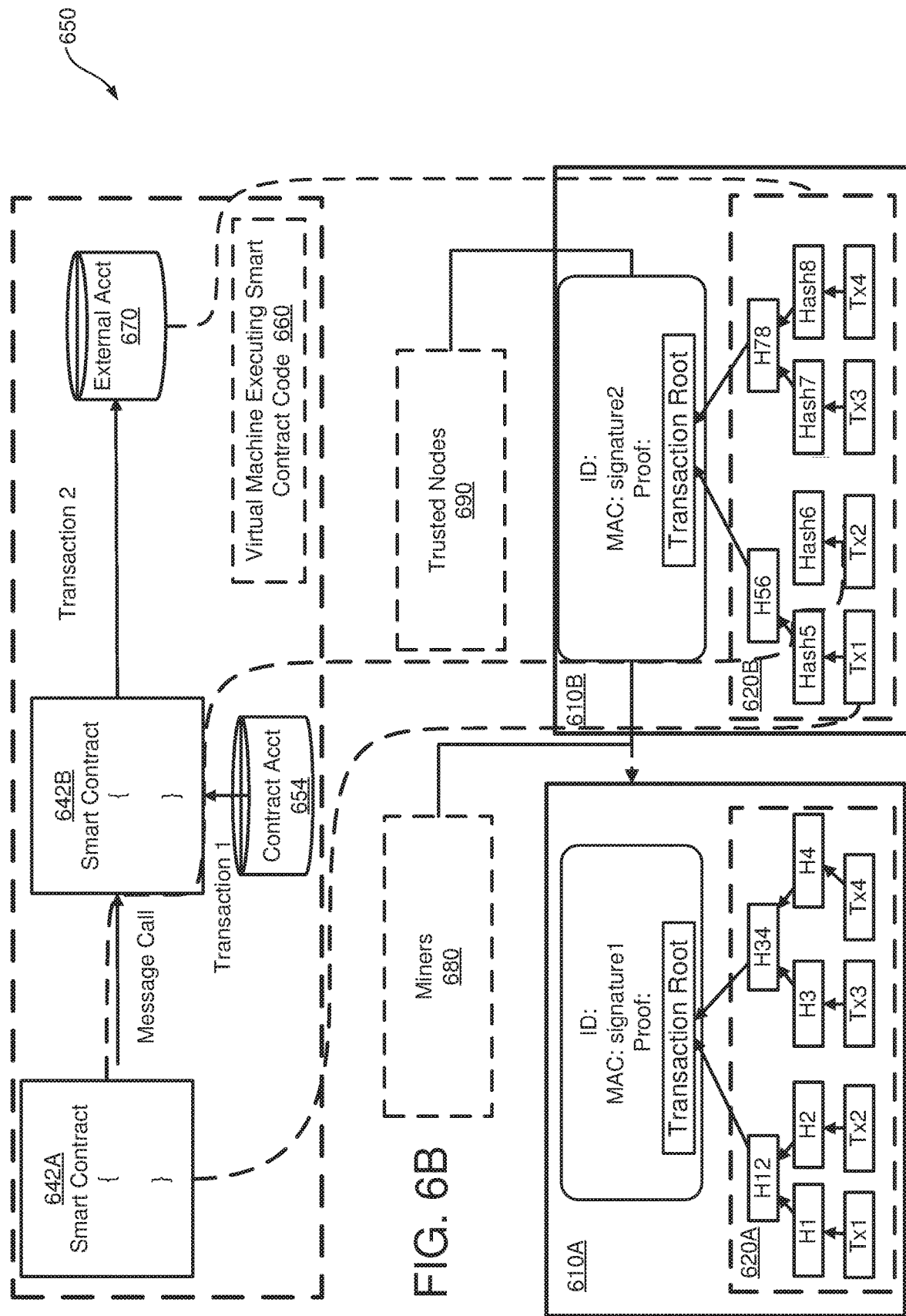
FIG. 6B is a data architecture diagram showing an illustrative example of smart contract code, transactions and messages that are bundled into a block so that their integrity is cryptographically secure and so that they may be appended to a blockchain ledger.

FIG. 6B is a data architecture diagram showing an illustrative example of smart contract code, transactions and messages that are bundled into a block so that their integrity is cryptographically secure and so that they may be appended to a blockchain ledger. In FIG. 6B, smart contracts 642 are code that executes on a computer. More specifically, the code of a smart contract may be stored in a blockchain ledger and executed by nodes of a distributed blockchain platform at a given time. The result of the smart code execution may be stored in a blockchain ledger. Optionally, a currency may be expended as smart contract code is executed. In the example of FIG. 6B, smart contracts 642 are executed in a virtual machine environment, although this is optional.

In FIG. 6B, the aspects of smart contracts 642 are stored in transaction data nodes in data tree 620 in the blocks 610 of the blockchain ledger of FIG. 6A. In the example of FIG. 6B, Smart Contract 642A is stored in data block Tx1 node 634A of data tree 620A in block 610A, Smart Contract 642B is stored in Tx2 node 638A, Contract Account 654 associated with Smart Contract 642B is stored in Tx3 node 644A, and External Account is stored in Tx4 node 648A.

Storage of Smart Contracts and Transaction Data in the Blockchain Ledger

To ensure the smart contracts are secure and generate secure data, the blockchain ledger must be kept up to date. For example, if a smart contract is created, the code associated with a smart contract must be stored in a secure way. Similarly, when smart contract code executes and generates transaction data, the transaction data must be stored in a secure way.

In the example of FIG. 6B, two possible embodiments for maintenance of the blockchain ledger are shown. In one embodiment, untrusted miner nodes ("miners") 680 may be rewarded for solving a cryptographic puzzle and thereby be allowed to append a block to the blockchain. Alternatively, a set of trusted nodes 690 may be used to append the next block to the blockchain ledger. Nodes may execute smart contract code, and then one winning node may append the next block to a blockchain ledger.

Though aspects of the technology disclosed herein resemble a smart contract, in the present techniques, the policy of the contract may determine the way that the blockchain ledger is maintained. For example, the policy may require that the validation or authorization process for blocks on the ledger is determined by a centralized control of a cluster of trusted nodes. In this case, the centralized control may be a trusted node, such as object originator environment 110, authorized to attest and sign the transaction blocks to validate them and validation by miners may not be needed.

Alternatively, the policy may provide for validation process decided by a decentralized cluster of untrusted nodes. In the situation where the blockchain ledger is distributed to a cluster of untrusted nodes, mining of blocks in the chain may be employed to validate the blockchain ledger.

Blockchains may use various time-stamping schemes, such as proof-of-work, to serialize changes. Alternate consensus methods include proof-of-stake, proof-of-burn, proof-of-research may also be utilized to serialize changes.

As noted above, in some examples, a blockchain ledger may be validated by miners to secure the blockchain. In this case, miners may collectively agree on a validation solution to be utilized. However, if a small network is utilized, e.g. private network, then the solution may be a Merkle tree and mining for the validation solution may not be required. When a transaction block is created, e.g. an object data block 142 for distributed application architecture using blockchain 140, the block is an unconfirmed and unidentified entity. To be part of the acknowledged "currency", it may be added to the blockchain, and therefore relates to the concept of a trusted cluster.

In a trusted cluster, when an object data block 142 is added, every node competes to acknowledge the next "transaction" (e.g. a new distributed application architecture data block). In one example, the nodes compete to mine and get the lowest hash value: min{previous_hash, contents_hash, random_nonce_to_be_guessed}→result. Transaction order is protected by the computational race (faith that no one entity can beat the collective resources of the blockchain network). Mutual authentication parameters are broadcast and acknowledged to prevent double entries in the blockchain.

Alternatively, by broadcasting the meta-data for authenticating a secure ledger across a restricted network, e.g. only the signed hash is broadcast, the blockchain may reduce the risks that come with data being held centrally. Decentralized consensus makes blockchains suitable for the recording of secure transactions or events. The meta-data, which may contain information related to the data file, may also be ciphered for restricted access so that the meta-data does not disclose information pertaining to the data file.

Figure 4D:
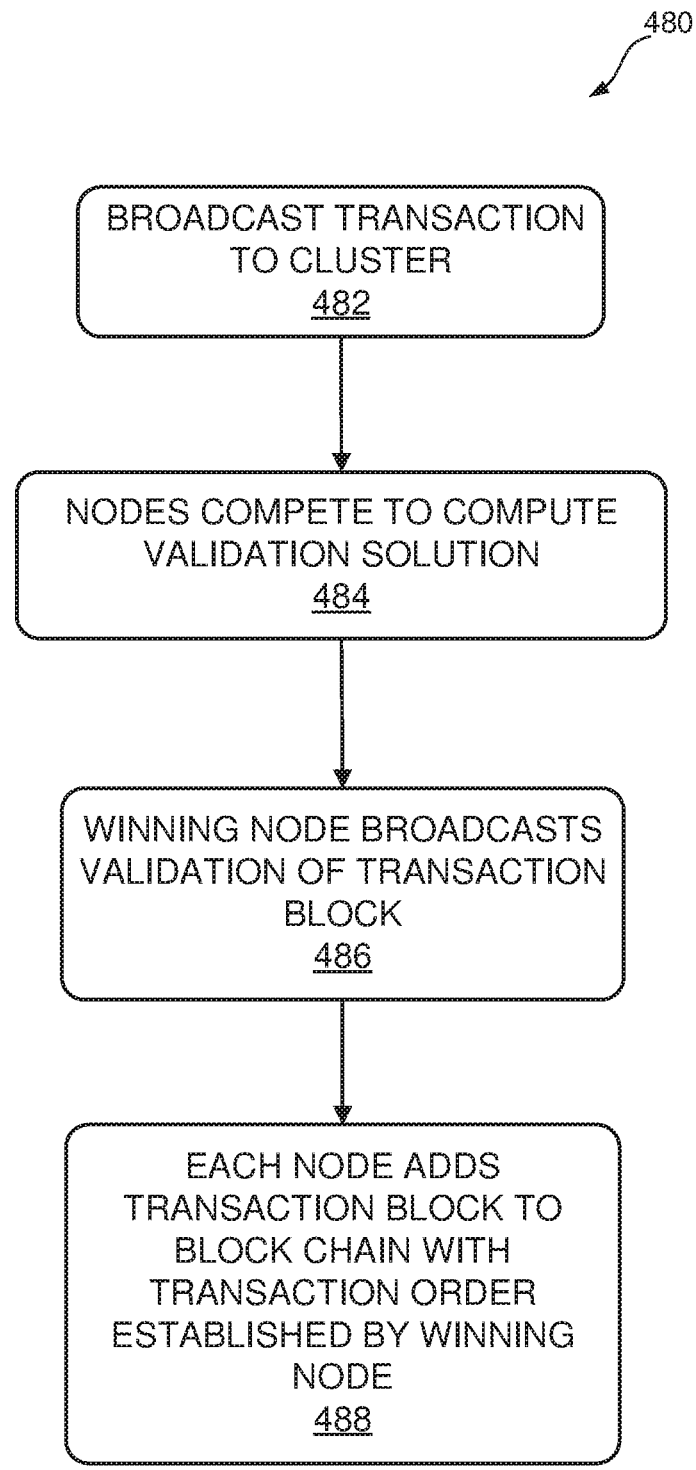
FIG. 4D is a control flow diagram illustrating an example of a validation process for blocks added to the distributed application architecture using blockchain and distributed file systems distributed to untrusted nodes.

The mining process, such as may be used in concert with the validation process 480 of FIG. 4D, may be utilized to deter double accounting, overriding or replaying attacks, with the community arrangement on the agreement based on the "good faith" that no single node can control the entire cluster. A working assumption for mining is the existence of equivalent power distribution of honest parties with supremacy over dishonest or compromised ones. Every node or miner in a decentralized system has a copy of the blockchain. No centralized "official" copy exists and no user is "trusted" more than any other. Transactions are broadcast, at 482, to the network using software. Mining nodes compete, at 484, to compute a validation solution to validate transactions, and then broadcast, at 486, the completed block validation to other nodes. Each node adds the block, at 488, to its copy of the blockchain with transaction order established by the winning node.

Note that in a restricted network, stake-holders who are authorized to check or mine for the data file may or may not access the transaction blocks themselves, but would need to have keys to the meta-data (since they are members of the restricted network, and are trusted) to get the details. As keys are applied on data with different data classifications, the stake-holders can be segmented.

A decentralized blockchain may also use ad-hoc secure message passing and distributed networking. In this example, the object data blockchain ledger may be different from a conventional blockchain in that there is a centralized clearing house, e.g. authorized central control for validation. Without the mining process, the trusted cluster can be contained in a centralized blockchain instead of a public or democratic blockchain. One way to view this is that a decentralized portion is as "democratic N honest parties" (multiparty honest party is a cryptography concept), and a centralized portion as a "trusted monarchy for blockchain information correction". For example, there may be advantages to maintaining the data file as centrally authorized and kept offline.

In some examples, access to object data blocks of a distributed application architecture may be restricted by cryptographic means to be only open to authorized servers. Since the object data blockchain ledger is distributed, the authorized servers can validate it. A public key may be used as an address on a public blockchain ledger.

Note that growth of a decentralized blockchain may be accompanied by the risk of node centralization because the computer resources required to operate on bigger data become increasingly expensive.

The present techniques may involve operations occurring in one or more machines. As used herein, "machine" means physical data-storage and processing hardware programed with instructions to perform specialized computing operations. It is to be understood that two or more different machines may share hardware components. For example, the same integrated circuit may be part of two or more different machines.

One of ordinary skill in the art will recognize that a wide variety of approaches may be utilized and combined with the present approach involving a distributed application architecture using a blockchain ledger and distributed file system. The specific examples of different aspects of a distributed application architecture using blockchain and distributed file system described herein are illustrative and are not intended to limit the scope of the techniques shown.

Smart Contracts

Smart contracts are defined by code. As described previously, the terms and conditions of the smart contract may be encoded (e.g., by hash) into a blockchain ledger. Specifically, smart contracts may be compiled into a bytecode (if executed in a virtual machine), and then the bytecode may be stored in a blockchain ledger as described previously. Similarly, transaction data executed and generated by smart contracts may be stored in the blockchain ledger in the ways previously described.

Computer Architectures for Use of Smart Contracts and Blockchain Ledgers

Figure 8:
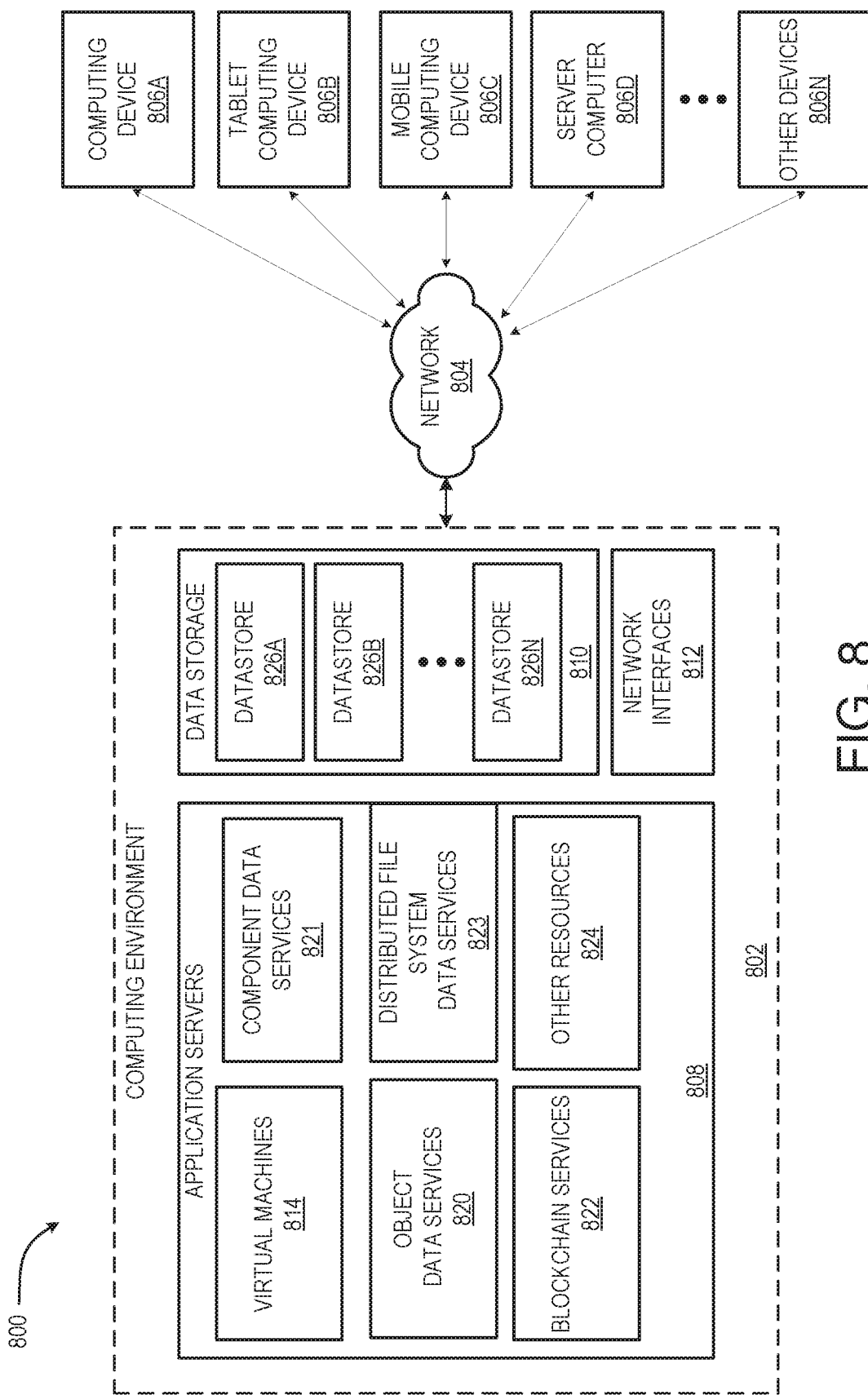
FIG. 8 is a diagram illustrating a distributed computing environment capable of implementing aspects of the techniques and technologies presented herein.

Note that at least parts of processes 400, 420, 440 and 480 of FIGS. 4A-D, the scripts of object data block 242 of FIGS. 2B, 3A and 3B, smart contract 522 of FIG. 5, smart contracts 642 of FIG. 6B, and other processes and operations pertaining to a distributed application architecture using blockchain and distributed file systems ledger described herein may be implemented in one or more servers, such as computer environment 800 in FIG. 8, or the cloud, and data defining the results of user control input signals translated or interpreted as discussed herein may be communicated to a user device for display. Alternatively, the distributed application architecture using blockchain and distributed file systems ledger processes may be implemented in a client device. In still other examples, some operations may be implemented in one set of computing resources, such as servers, and other steps may be implemented in other computing resources, such as a client device.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routines (e.g. processes 400, 420, 440 and 480 of FIGS. 4A-D, the scripts of object data block 242 of FIGS. 2B, 3A and 3B, smart contract 522 of FIG. 5, smart contracts 642 of FIG. 6B) are described herein as being implemented, at least in part, by an application, component, and/or circuit. Although the following illustration refers to the components of FIGS. 1, 3B, 4-D, 5 and 6B, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

Although the following illustration refers to the components of the FIGURES discussed above, it can be appreciated that the operations of the routines (e.g. processes 400, 420, 440 and 480 of FIGS. 4A-D, the scripts of object data block 242 of FIGS. 2B, 3A and 3B, smart contract 522 of FIG. 5, smart contracts 642 of FIG. 6B) may be also implemented in many other ways. For example, the routines may be implemented, at least in part, by a processor of another remote computer or a local computer or circuit. In addition, one or more of the operations of the routines may alternatively or additionally be implemented, at least in part, by a chipset working alone or in conjunction with other software modules. Any service, circuit or application suitable for providing the techniques disclosed herein can be used in operations described herein.

Figure 7:
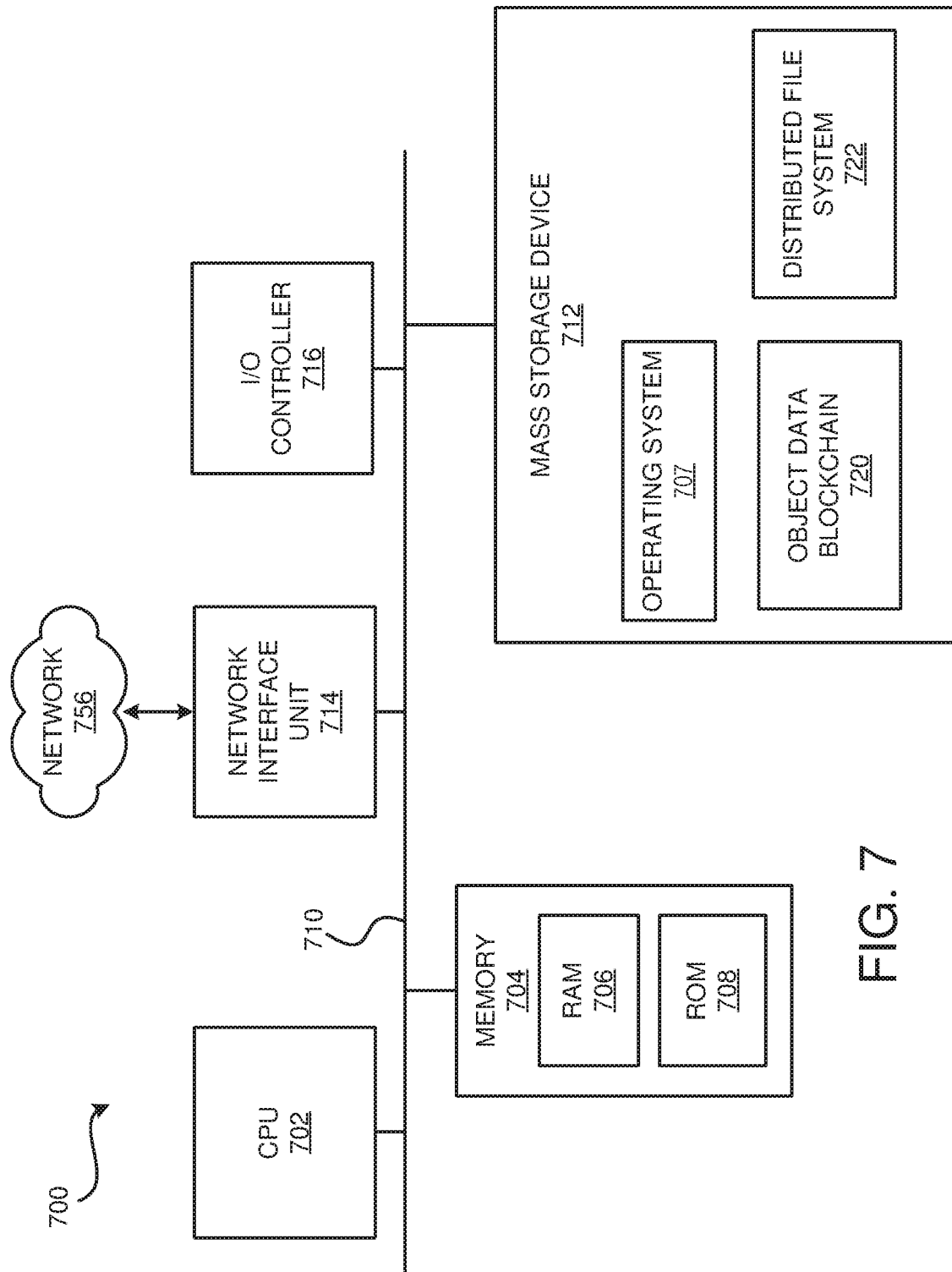
FIG. 7 is a computer architecture diagram illustrating an illustrative computer hardware and software architecture for a computing system capable of implementing aspects of the techniques and technologies presented herein.

FIG. 7 shows additional details of an example computer architecture 700 for a computer, such as the devices 110, 120, 130 and 154 (FIG. 1), capable of executing the program components described herein. Thus, the computer architecture 700 illustrated in FIG. 7 illustrates an architecture for a server computer, mobile phone, a PDA, a smart phone, a desktop computer, a netbook computer, a tablet computer, an on-board computer, a game console, and/or a laptop computer. The computer architecture 700 may be utilized to execute any aspects of the software components presented herein.

The computer architecture 700 illustrated in FIG. 7 includes a central processing unit 702 ("CPU"), a system memory 704, including a random access memory 706 ("RAM") and a read-only memory ("ROM") 708, and a system bus 710 that couples the memory 704 to the CPU 702. A basic input/output system containing the basic routines that help to transfer information between sub-elements within the computer architecture 700, such as during startup, is stored in the ROM 708. The computer architecture 700 further includes a mass storage device 712 for storing an operating system 707, data (such as a copy of object data blockchain 720 of the distributed application architecture and a part of distributed file system 722), and one or more application programs.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes the claims, the phrase "computer storage medium," "computer-readable storage medium" and variations thereof, does not include waves, signals, and/or other transitory and/or intangible communication media, per se.

According to various configurations, the computer architecture 700 may operate in a networked environment using logical connections to remote computers through the network 756 and/or another network (not shown). The computer architecture 700 may connect to the network 756 through a network interface unit 714 connected to the bus 710. It should be appreciated that the network interface unit 714 also may be utilized to connect to other types of networks and remote computer systems. The computer architecture 700 also may include an input/output controller 716 for receiving and processing input from a number of other devices, including a keyboard, mouse, game controller, television remote or electronic stylus (not shown in FIG. 7). Similarly, the input/output controller 716 may provide output to a display screen, a printer, or other type of output device (also not shown in FIG. 7).

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

FIG. 8 depicts an illustrative distributed computing environment 800 capable of executing the software components described herein for a distributed application architecture using blockchain and distributed file systems ledger. Thus, the distributed computing environment 800 illustrated in FIG. 8 can be utilized to execute many aspects of the software components presented herein. For example, the distributed computing environment 800 can be utilized to execute one or more aspects of the software components described herein. Also, the distributed computing environment 800 may represent components of the distributed blockchain platform discussed above.

According to various implementations, the distributed computing environment 800 includes a computing environment 802 operating on, in communication with, or as part of the network 804. The network 804 may be or may include the network 556, described above. The network 804 also can include various access networks. One or more client devices 806A-806N (hereinafter referred to collectively and/or generically as "clients 806") can communicate with the computing environment 802 via the network 804 and/or other connections (not illustrated in FIG. 8). In one illustrated configuration, the clients 806 include a computing device 806A, such as a laptop computer, a desktop computer, or other computing device; a slate or tablet computing device ("tablet computing device") 806B; a mobile computing device 806C such as a mobile telephone, a smart phone, an on-board computer, or other mobile computing device; a server computer 806D; and/or other devices 806N, which can include a hardware security module. It should be understood that any number of devices 806 can communicate with the computing environment 802. Two example computing architectures for the devices 806 are illustrated and described herein with reference to FIGS. 7 and 8. It should be understood that the illustrated devices 806 and computing architectures illustrated and described herein are illustrative only and should not be construed as being limited in any way.

In the illustrated configuration, the computing environment 802 includes application servers 808, data storage 810, and one or more network interfaces 812. According to various implementations, the functionality of the application servers 808 can be provided by one or more server computers that are executing as part of, or in communication with, the network 804. The application servers 808 can host various services, virtual machines, portals, and/or other resources. In the illustrated configuration, the application servers 808 host one or more virtual machines 814 for hosting applications or other functionality. According to various implementations, the virtual machines 814 host one or more applications and/or software modules for a data management blockchain ledger. It should be understood that this configuration is illustrative only and should not be construed as being limiting in any way.

According to various implementations, the application servers 808 also include one or more data file management services 820 and one or more blockchain services 822. The data file management services 820 can include services for managing a data file on a distributed application architecture using blockchain and distributed file systems, such as distributed application architecture using blockchain and distributed file systems 140 in FIG. 1. The blockchain services 822 can include services for participating in management of one or more blockchains, such as by creating genesis blocks, distributed application architecture data blocks, and performing validation.

As shown in FIG. 8, the application servers 808 also can host other services, applications, portals, and/or other resources ("other resources") 824. The other resources 824 can include, but are not limited to, data encryption, data sharing, or any other functionality.

As mentioned above, the computing environment 802 can include data storage 810. According to various implementations, the functionality of the data storage 810 is provided by one or more databases or data stores operating on, or in communication with, the network 804. The functionality of the data storage 810 also can be provided by one or more server computers configured to host data for the computing environment 802. The data storage 810 can include, host, or provide one or more real or virtual data stores 826A-826N (hereinafter referred to collectively and/or generically as "datastores 826"). The datastores 826 are configured to host data used or created by the application servers 808 and/or other data. Aspects of the datastores 826 may be associated with services for a distributed application architecture using blockchain and distributed file systems. Although not illustrated in FIG. 8, the datastores 826 also can host or store web page documents, word documents, presentation documents, data structures, algorithms for execution by a recommendation engine, and/or other data utilized by any application program or another module.

The computing environment 802 can communicate with, or be accessed by, the network interfaces 812. The network interfaces 812 can include various types of network hardware and software for supporting communications between two or more computing devices including, but not limited to, the clients 806 and the application servers 808. It should be appreciated that the network interfaces 812 also may be utilized to connect to other types of networks and/or computer systems.

It should be understood that the distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 may provide the software functionality described herein as a service to the clients using devices 806. It should be understood that the devices 806 can include real or virtual machines including, but not limited to, server computers, web servers, personal computers, mobile computing devices, smart phones, and/or other devices, which can include user input devices. As such, various configurations of the concepts and technologies disclosed herein enable any device configured to access the distributed computing environment 800 to utilize the functionality described herein for creating and supporting a distributed application architecture using blockchain and distributed file systems ledger, among other aspects.

Figure 9:
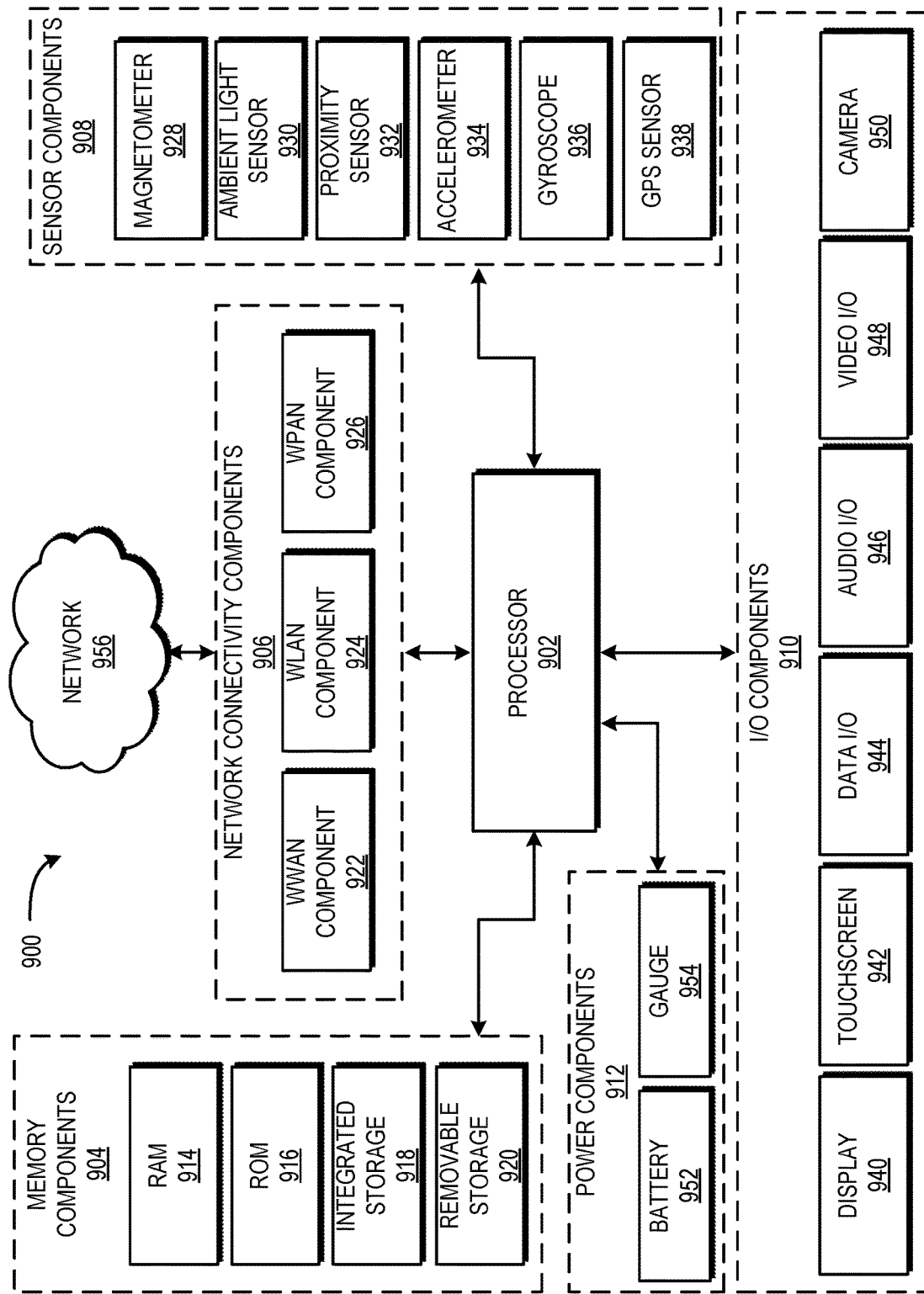
FIG. 9 is a computer architecture diagram illustrating a computing device architecture for a computing device capable of implementing aspects of the techniques and technologies presented herein.

Turning now to FIG. 9, an illustrative computing device architecture 900 for a computing device that is capable of executing various software components is described herein for a distributed application architecture using blockchain and distributed file systems ledger. The computing device architecture 900 is applicable to computing devices that can manage a distributed application architecture using blockchain and distributed file systems ledger. In some configurations, the computing devices include, but are not limited to, mobile telephones, on-board computers, tablet devices, slate devices, portable video game devices, traditional desktop computers, portable computers (e.g., laptops, notebooks, ultra-portables, and netbooks), server computers, game consoles, and other computer systems. The computing device architecture 900 is applicable to the object originator environment 110 and client/servers 120A-C shown in FIG. 1 and computing device 806A-N shown in FIG. 8.

The computing device architecture 900 illustrated in FIG. 9 includes a processor 902, memory components 904, network connectivity components 906, sensor components 908, input/output components 910, and power components 912. In the illustrated configuration, the processor 902 is in communication with the memory components 904, the network connectivity components 906, the sensor components 908, the input/output ("I/O") components 910, and the power components 912. Although no connections are shown between the individual components illustrated in FIG. 9, the components can interact to carry out device functions. In some configurations, the components are arranged so as to communicate via one or more busses (not shown).

The processor 902 includes a central processing unit ("CPU") configured to process data, execute computer-executable instructions of one or more application programs, and communicate with other components of the computing device architecture 900 in order to perform various functionality described herein. The processor 902 may be utilized to execute aspects of the software components presented herein and, particularly, those that utilize, at least in part, secure data.

In some configurations, the processor 902 includes a graphics processing unit ("GPU") configured to accelerate operations performed by the CPU, including, but not limited to, operations performed by executing secure computing applications, general-purpose scientific and/or engineering computing applications, as well as graphics-intensive computing applications such as high resolution video (e.g., 620P, 1080P, and higher resolution), video games, three-dimensional ("3D") modeling applications, and the like. In some configurations, the processor 902 is configured to communicate with a discrete GPU (not shown). In any case, the CPU and GPU may be configured in accordance with a co-processing CPU/GPU computing model, wherein a sequential part of an application executes on the CPU and a computationally-intensive part is accelerated by the GPU.

In some configurations, the processor 902 is, or is included in, a system-on-chip ("SoC") along with one or more of the other components described herein below. For example, the SoC may include the processor 902, a GPU, one or more of the network connectivity components 906, and one or more of the sensor components 908. In some configurations, the processor 902 is fabricated, in part, utilizing a package-on-package ("PoP") integrated circuit packaging technique. The processor 902 may be a single core or multi-core processor.

The processor 902 may be created in accordance with an ARM architecture, available for license from ARM HOLDINGS of Cambridge, United Kingdom. Alternatively, the processor 902 may be created in accordance with an x86 architecture, such as is available from INTEL CORPORATION of Mountain View, California and others. In some configurations, the processor 902 is a SNAPDRAGON SoC, available from QUALCOMM of San Diego, California, a TEGRA SoC, available from NVIDIA of Santa Clara, California, a HUMMINGBIRD SoC, available from SAMSUNG of Seoul, South Korea, an Open Multimedia Application Platform ("OMAP") SoC, available from TEXAS INSTRUMENTS of Dallas, Texas, a customized version of any of the above SoCs, or a proprietary SoC.

The memory components 904 include a random access memory ("RAM") 914, a read-only memory ("ROM") 916, an integrated storage memory ("integrated storage") 918, and a removable storage memory ("removable storage") 920. In some configurations, the RAM 914 or a portion thereof, the ROM 916 or a portion thereof, and/or some combination of the RAM 914 and the ROM 916 is integrated in the processor 902. In some configurations, the ROM 916 is configured to store a firmware, an operating system or a portion thereof (e.g., operating system kernel), and/or a bootloader to load an operating system kernel from the integrated storage 918 and/or the removable storage 920.

The integrated storage 918 can include a solid-state memory, a hard disk, or a combination of solid-state memory and a hard disk. The integrated storage 918 may be soldered or otherwise connected to a logic board upon which the processor 902 and other components described herein also may be connected. As such, the integrated storage 918 is integrated in the computing device. The integrated storage 918 is configured to store an operating system or portions thereof, application programs, data, and other software components described herein.

The removable storage 920 can include a solid-state memory, a hard disk, or a combination of solid-state memory and a hard disk. In some configurations, the removable storage 920 is provided in lieu of the integrated storage 918. In other configurations, the removable storage 920 is provided as additional optional storage. In some configurations, the removable storage 920 is logically combined with the integrated storage 918 such that the total available storage is made available as a total combined storage capacity. In some configurations, the total combined capacity of the integrated storage 918 and the removable storage 920 is shown to a user instead of separate storage capacities for the integrated storage 918 and the removable storage 920.

The removable storage 920 is configured to be inserted into a removable storage memory slot (not shown) or other mechanism by which the removable storage 920 is inserted and secured to facilitate a connection over which the removable storage 920 can communicate with other components of the computing device, such as the processor 902. The removable storage 920 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 904 can store an operating system. According to various configurations, the operating system may include, but is not limited to, server operating systems such as various forms of UNIX certified by The Open Group and LINUX certified by the Free Software Foundation, or aspects of Software-as-a-Service (SaaS) architectures, such as MICROSFT AZURE from Microsoft Corporation of Redmond, Washington or AWS from Amazon Corporation of Seattle, Washington. The operating system may also include WINDOWS MOBILE OS from Microsoft Corporation of Redmond, Washington, WINDOWS PHONE OS from Microsoft Corporation, WINDOWS from Microsoft Corporation, MAC OS or IOS from Apple Inc. of Cupertino, California, and ANDROID OS from Google Inc. of Mountain View, California. Other operating systems are contemplated.

The network connectivity components 906 include a wireless wide area network component ("WWAN component") 922, a wireless local area network component ("WLAN component") 924, and a wireless personal area network component ("WPAN component") 926. The network connectivity components 906 facilitate communications to and from the network 956 or another network, which may be a WWAN, a WLAN, or a WPAN. Although only the network 956 is illustrated, the network connectivity components 906 may facilitate simultaneous communication with multiple networks, including the network 956 of FIG. 9. For example, the network connectivity components 906 may facilitate simultaneous communications with multiple networks via one or more of a WWAN, a WLAN, or a WPAN.

The network 956 may be or may include a WWAN, such as a mobile telecommunications network utilizing one or more mobile telecommunications technologies to provide voice and/or data services to a computing device utilizing the computing device architecture 900 via the WWAN component 922. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 956 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 956 may be configured to provide voice and/or data communications with any combination of the above technologies. The network 956 may be configured to or be adapted to provide voice and/or data communications in accordance with future generation technologies.

In some configurations, the WWAN component 922 is configured to provide dual-multi-mode connectivity to the network 956. For example, the WWAN component 922 may be configured to provide connectivity to the network 956, wherein the network 956 provides service via GSM and UMTS technologies, or via some other combination of technologies. Alternatively, multiple WWAN components 922 may be utilized to perform such functionality, and/or provide additional functionality to support other non-compatible technologies (i.e., incapable of being supported by a single WWAN component). The WWAN component 922 may facilitate similar connectivity to multiple networks (e.g., a UMTS network and an LTE network).

The network 956 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 924 is configured to connect to the network 956 via the WI-FI access points. Such connections may be secured via various encryption technologies including, but not limited to, WI-FI Protected Access ("WPA"), WPA2, Wired Equivalent Privacy ("WEP"), and the like.

The network 956 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 926 is configured to facilitate communications with other devices, such as peripherals, computers, or other computing devices via the WPAN.

The sensor components 908 include a magnetometer 928, an ambient light sensor 930, a proximity sensor 932, an accelerometer 934, a gyroscope 936, and a Global Positioning System sensor ("GPS sensor") 938. It is contemplated that other sensors, such as, but not limited to, temperature sensors or shock detection sensors, also may be incorporated in the computing device architecture 900.

The I/O components 910 include a display 940, a touchscreen 942, a data I/O interface component ("data I/O") 944, an audio I/O interface component ("audio I/O") 946, a video I/O interface component ("video I/O") 948, and a camera 950. In some configurations, the display 940 and the touchscreen 942 are combined. In some configurations two or more of the data I/O component 944, the audio I/O component 946, and the video I/O component 948 are combined. The I/O components 910 may include discrete processors configured to support the various interfaces described below or may include processing functionality built-in to the processor 902.

The illustrated power components 912 include one or more batteries 952, which can be connected to a battery gauge 954. The batteries 952 may be rechargeable or disposable. Rechargeable battery types include, but are not limited to, lithium polymer, lithium ion, nickel cadmium, and nickel metal hydride. Each of the batteries 952 may be made of one or more cells.

The power components 912 may also include a power connector, which may be combined with one or more of the aforementioned I/O components 910. The power components 912 may interface with an external power system or charging equipment via an I/O component.

Examples of Various Implementations

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The present disclosure is made in light of the following clauses:

Clause 1: A computer-implemented method for storing data for a listing, the method comprising: identifying a first set of data and a second set of data in a listing; storing each element of the first set of data in a data block file on a distributed file system, the data block file having an address on the distributed file system; creating an object data block on a blockchain, the object data block including the second set of data and the address on the distributed file system for each element of the first set of data; and committing the object data block to the blockchain.

Clause 2. The computer-implemented method of Clause 1, where: the first set of data comprises one or more of a graphical element, promotional text, image data or video data for the listing; and the second set of data comprises one or more of an identifier for the listing, an identifier of an owner of the listing, a price, a description of goods or services, terms of a sale, parties to the sale, date of the sale, a sales platform identifier, a payment status, a date of shipping and a confirmation of delivery.

Clause 3. The computer-implemented method of Clause 1, where the first and second sets of data are differentiated by one or more of a data definition for the listing and an algorithmic analysis of the listing.

Clause 4. The computer-implemented method of Clause 1, where the distributed file system can delete the data block files for the first set of data.

Clause 5. The computer-implemented method of Clause 1, where the method includes: responsive to a request for the listing from a requestor, retrieving the object data block for the listing from the blockchain; for each element of the first set of data, obtaining the data block file for the element using the address on the distributed file system in the object data block; obtaining the second set of data from the object data block; reassembling the listing from the first and second sets of data to create a reassembled listing; and returning the reassembled listing to the requestor.

Clause 6. The computer-implemented method of Clause 5, where: the first set of data includes one or more graphical elements in the distributed file system; and the method includes processing the reassembled listing for display of the listing.

Clause 7. The computer-implemented method of Clause 6, where: the method includes storing metadata for the listing in the object data block; and the step of processing the reassembled listing for display of the listing comprises processing the reassembled listing for display of the listing utilizing the metadata in the object data block.

Clause 8. A distributed application architecture system for storing a data object, the system comprising: one or more processors; and one or more memory devices in communication with the one or more processors, the memory devices having computer-readable instructions stored thereupon that, when executed by the processors, cause the processors to perform a method comprising: identifying a first set of data and a second set of data in a data object; storing each element of the first set of data in a data block file for the element on a distributed file system, the data block file having an address on the distributed file system; creating an object data block on a blockchain, the object data block including the second set of data and the address on the distributed file system for the data block file for each element of the first set of data; and committing the object data block to the blockchain.

Clause 9. The distributed application architecture system of Clause 8, where: the first set of data comprises one or more of a graphical element, promotional text, image data or video data; and the second set of data comprises one or more of an identifier for the data object, an identifier of an owner of the data object, a price, a description of goods or services, terms of a sale, parties to the sale, date of the sale, a sales platform identifier, a payment status, a date of shipping and a confirmation of delivery.

Clause 10. The distributed application architecture system of Clause 8, where the first and second sets of data are differentiated by one or more of a data definition for the data object and an algorithmic analysis of the data object.

Clause 11. The distributed application architecture system of Clause 8, where the distributed file system can delete the data block files for the first set of data.

Clause 12. The distributed application architecture system of Clause 8, where the method includes: responsive to a request for the listing from a requestor, retrieving the object data block for the data object from the blockchain; for each element of the first set of data, obtaining the data block file for the element using the address on the distributed file system in the object data block; obtaining the second set of data from the object data block; reassembling the data object from the first and second sets of data to create a reassembled data object; and returning the reassembled data object to the requestor.

Clause 13. The distributed application architecture system of Clause 12, where: the first set of data includes one or more graphical elements in the distributed file system; and the method includes processing the reassembled data object for display of the data object.

Clause 14. The distributed application architecture system of Clause 13, where: the method includes storing XML metadata for the data object in the object data block; and the step of processing the reassembled data object for display of the data object comprises processing the reassembled data object for display of the data object utilizing the XML metadata in the object data block.

Clause 15. One or more computer storage media having computer executable instructions stored thereon which, when executed by one or more processors, cause the processors to execute a method for storing a data object in a distributed application architecture comprising: identifying a first set of data and a second set of data in a data object; storing each element of the first set of data in a data block file for the element on a distributed file system, the data block file having an address on the distributed file system; creating an object data block on a blockchain, the object data block including the second set of data and the address on the distributed file system for the data block file for each element of the first set of data; and committing the object data block to the blockchain.

Clause 16. The one or more computer storage media of Clause 15, where: the first set of data comprises one or more elements of critical data; and the second set of data comprises one or more elements of noncritical data.

Clause 17. The one or more computer storage media of Clause 15, where the first and second sets of data are differentiated by one or more of a data definition for the data object and an algorithmic analysis of the data object.

Clause 18. The one or more computer storage media of Clause 15, where the distributed file system can delete the data block files for the first set of data.

Clause 19. The one or more computer storage media of Clause 15, where the method includes: responsive to a request for the data object from a requestor, retrieving the object data block for the data object from the blockchain; for each element of the first set of data, obtaining the data block file for the element using the address on the distributed file system in the object data block; obtaining the second set of data from the object data block; reassembling the data object from the first and second sets of data to create a reassembled data object; and returning the reassembled data object to the requestor.

Clause 20. The one or more computer storage media of Clause 19, where: metadata defined for the data object is stored in the object data file; at least one of the first set of data and second set of data includes one or more graphical elements; and the method includes processing the reassembled data object for display utilizing the metadata stored in the object data file.

Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method comprising:
   storing a first set of data from a data object at an address on a distributed file system;
   storing a second set of data from the data object on a blockchain; and
   in response to a request for the data object, executing a script from the blockchain to generate a reassembled data object by:
   obtaining, from the blockchain, metadata defining a format for the first set of data and the second set of data to reassemble the data object,
   obtaining the second set of data from the blockchain,
   obtaining the first set of data from the distributed file system using the address, and
   generating the reassembled data object using the first set of data and the second set of data based on the format defined by the metadata.

2. The computer-implemented method of claim 1, wherein the method further comprises:
   identifying the first set of data as corresponding to a first class of data and the second set of data as corresponding to a second class of data, wherein the first set of data is stored on the distributed file system based on the first set of data corresponding to the first class of data, and wherein the second set of data is stored on the blockchain based on the second set of data corresponding to the second class of data.

3. The computer-implemented method of claim 2, wherein the first class of data comprises noncritical data, and wherein the second class of data comprises critical data.

4. The computer-implemented method of claim 2, wherein the first set of data is identified as corresponding to the first class of data and the second set of data is identified as corresponding to the second class of data by algorithmically analyzing the data object.

5. The computer-implemented method of claim 1, wherein the data object comprises an item listing, wherein the first set of data comprises one or more selected from the following: a graphical element, promotional text, image data, and video data for the item listing; and wherein the second set of data comprises one or more selected from the following: an identifier for the item listing, an identifier of an owner of the item listing, a price, a description of goods or services, terms of a sale, parties to the sale, date of the sale, a sales platform identifier, a payment status, a date of shipping, and a confirmation of delivery.

6. The computer-implemented method of claim 1, wherein the second set of data is stored on a block on the blockchain, and wherein the block also stores an address for the first set of data on the distributed filed system.

7. The computer-implemented method of claim 6, wherein the block on the blockchain further stores the metadata.

8. One or more computer storage media storing computer-useable instructions that, when used by a computing device, cause the computing device to perform operations, the operations comprising:
   storing a first set of data from a data object at an address on a distributed file system;
   storing a second set of data from the data object on a blockchain; and
   in response to a request for the data object, executing a script from the blockchain to generate a reassembled data object by:
   obtaining, from the blockchain, metadata defining a format for the first set of data and the second set of data to reassemble the data object,
   obtaining the second set of data from the blockchain,
   obtaining the first set of data from the distributed file system using the address, and
   generating the reassembled data object using the first set of data and the second set of data based on the format defined by the metadata.

9. The one or more computer storage media of claim 8, wherein the operations further comprise:
   identifying the first set of data as corresponding to a first class of data and the second set of data as corresponding to a second class of data, wherein the first set of data is stored on the distributed file system based on the first set of data corresponding to the first class of data, and wherein the second set of data is stored on the blockchain based on the second set of data corresponding to the second class of data.

10. The one or more computer storage media of claim 9, wherein the first class of data comprises noncritical data, and wherein the second class of data comprises critical data.

11. The one or more computer storage media of claim 9, wherein the first set of data is identified as corresponding to the first class of data and the second set of data is identified as corresponding to the second class of data by algorithmically analyzing the data object.

12. The one or more computer storage media of claim 8, wherein the data object comprises an item listing, wherein the first set of data comprises one or more selected from the following: a graphical element, promotional text, image data, and video data for the item listing; and wherein the second set of data comprises one or more selected from the following: an identifier for the item listing, an identifier of an owner of the item listing, a price, a description of goods or services, terms of a sale, parties to the sale, date of the sale, a sales platform identifier, a payment status, a date of shipping, and a confirmation of delivery.

13. The one or more computer storage media of claim 8, wherein the second set of data is stored on a block on the blockchain, and wherein the block also stores an address for the first set of data on the distributed filed system.

14. The one or more computer storage media of claim 13, wherein the block on the blockchain further stores the metadata.

15. A computer system comprising:
   a processor; and
   a computer storage medium storing computer-useable instructions that, when used by the processor, causes the computer system to perform operations comprising:
   storing a first set of data from a data object at an address on a distributed file system;
   storing a second set of data from the data object on a blockchain; and
   in response to a request for the data object, executing a script from the blockchain to generate a reassembled data object by:
   obtaining, from the blockchain, metadata defining a format for the first set of data and the second set of data to reassemble the data object,
   obtaining the second set of data from the blockchain,
   obtaining the first set of data from the distributed file system using the address, and
   generating the reassembled data object using the first set of data and the second set of data based on the format defined by the metadata.

16. The computer system of claim 15, wherein the operations further comprise:
   identifying the first set of data as corresponding to a first class of data and the second set of data as corresponding to a second class of data, wherein the first set of data is stored on the distributed file system based on the first set of data corresponding to the first class of data, and wherein the second set of data is stored on the blockchain based on the second set of data corresponding to the second class of data.

17. The computer system of claim 16, wherein the first class of data comprises noncritical data, and wherein the second class of data comprises critical data.

18. The computer system of claim 16, wherein the first set of data is identified as corresponding to the first class of data and the second set of data is identified as corresponding to the second class of data by algorithmically analyzing the data object.

19. The computer system of claim 15, wherein the data object comprises an item listing, wherein the first set of data comprises one or more selected from the following: a graphical element, promotional text, image data, and video data for the item listing; and wherein the second set of data comprises one or more selected from the following: an identifier for the item listing, an identifier of an owner of the item listing, a price, a description of goods or services, terms of a sale, parties to the sale, date of the sale, a sales platform identifier, a payment status, a date of shipping, and a confirmation of delivery.

20. The computer system of claim 15, wherein the second set of data is stored on a block on the blockchain, and wherein the block also stores an address for the first set of data on the distributed filed system, and wherein the block on the blockchain further stores the metadata.

* * * * *